United States Patent
Lacroix et al.

(10) Patent No.: US 11,542,610 B2
(45) Date of Patent: Jan. 3, 2023

(54) SYSTEM FOR HIGH-TEMPERATURE REVERSIBLE ELECTROLYSIS OF WATER COMPRISING A HYDRIDE TANK COUPLED WITH THE ELECTROLYSER

(71) Applicant: COMMISSARIAT À L'ÉNERGIE ATOMIQUE ET AUX ÉNERGIES ALTERNATIVES, Paris (FR)

(72) Inventors: Vincent Lacroix, Grenoble (FR); Albin Chaise, Grenoble (FR); Julie Cren, Saint Martin D'uriage (FR); Magali Reytier, Villard de Lans (FR); Guilhem Roux, Saint Egreve (FR)

(73) Assignee: COMMISSARIAT À L'ÉNERGIE ATOMIQUE ET AUX ÉNERGIES ALTERNATIVES, Paris (FR)

(*) Notice: Subject to any disclaimer, the term of this patent is extended or adjusted under 35 U.S.C. 154(b) by 8 days.

(21) Appl. No.: 16/333,299

(22) PCT Filed: Sep. 18, 2017

(86) PCT No.: PCT/FR2017/052478
§ 371 (c)(1),
(2) Date: Mar. 14, 2019

(87) PCT Pub. No.: WO2018/051041
PCT Pub. Date: Mar. 22, 2018

(65) Prior Publication Data
US 2019/0245224 A1    Aug. 8, 2019

(30) Foreign Application Priority Data
Sep. 19, 2016 (FR) ...................................... 1658750

(51) Int. Cl.
*H01M 8/04082* (2016.01)
*C25B 1/04* (2021.01)
(Continued)

(52) U.S. Cl.
CPC .................. *C25B 1/04* (2013.01); *C25B 9/70* (2021.01); *C25B 15/02* (2013.01); *C25B 15/08* (2013.01);
(Continued)

(58) Field of Classification Search
CPC .. C25B 1/04; C25B 9/70; C25B 15/02; C25B 15/08; H01M 8/186; H01M 8/04014;
(Continued)

(56) References Cited

U.S. PATENT DOCUMENTS

| 4,574,112 A | 3/1986 | Breault et al. |
| 6,821,663 B2 * | 11/2004 | McElroy ............... H01M 8/184 429/418 |

(Continued)

FOREIGN PATENT DOCUMENTS

| FR | 3016021 A1 | 7/2015 |
| GB | 2151840 A | 12/1984 |

(Continued)

OTHER PUBLICATIONS

Ferrero, Domenico. A comparative assessment on hydrogen production from low- and high-temperature electrolysis. 2012. Hydrogen Energy Publications, LLC. Elsevier Ltd. pp. 3523-3536 (Year: 2012).*

(Continued)

*Primary Examiner* — Ula C Ruddock
*Assistant Examiner* — Mary Grace Byram
(74) *Attorney, Agent, or Firm* — Pearne & Gordon LLP

(57) ABSTRACT

A system for high-temperature reversible electrolysis of water, characterised in that it includes: a high-temperature reversible electrolyser, configured to operate in SOEC (solid oxide electrolyser cell) mode to produce hydrogen and store electricity, and/or in SOFC (solid oxide fuel cell) mode to withdraw hydrogen and produce electricity; a hydride tank, (Continued)

thermally coupled with the reversible electrolyser, the system being configured to allow the recovery of heat released by the hydride tank during hydrogen absorption in order to produce pressurised steam intended for entering the reversible electrolyser in SOEC mode, and to allow the recovery of heat released by the one or more outgoing streams from the reversible electrolyser in SOFC mode so as to allow the desorption of hydrogen from the hydride tank.

37 Claims, 8 Drawing Sheets

(51) Int. Cl.
    *C25B 15/08*     (2006.01)
    *H01M 8/04014*     (2016.01)
    *H01M 8/18*     (2006.01)
    *C25B 15/02*     (2021.01)
    *C25B 9/70*     (2021.01)
    *H01M 8/04007*     (2016.01)
    *H01M 8/12*     (2016.01)

(52) U.S. Cl.
CPC ... *H01M 8/04007* (2013.01); *H01M 8/04014* (2013.01); *H01M 8/04216* (2013.01); *H01M 8/186* (2013.01); *H01M 2008/1293* (2013.01); *Y02E 60/36* (2013.01); *Y02E 60/50* (2013.01); *Y02P 20/129* (2015.11)

(58) Field of Classification Search
CPC ......... H01M 8/04216; H01M 8/04007; H01M 2008/1293; H01M 18/18
See application file for complete search history.

(56) References Cited

U.S. PATENT DOCUMENTS

| | | | | |
|---|---|---|---|---|
| 2004/0081859 | A1* | 4/2004 | McElroy | H01M 8/184 429/1 |
| 2004/0185313 | A1* | 9/2004 | Halter | H01M 8/186 429/418 |
| 2006/0105213 | A1 | 5/2006 | Otsuka | |
| 2008/0083614 | A1 | 4/2008 | Swalla et al. | |
| 2008/0187789 | A1* | 8/2008 | Ghezel-Ayagh | H01M 8/04014 429/414 |
| 2008/0289955 | A1* | 11/2008 | Balestrino | C25B 15/08 204/274 |
| 2009/0263680 | A1 | 10/2009 | Mata et al. | |
| 2010/0055517 | A1* | 3/2010 | Uzhinsky | C01B 3/065 429/495 |
| 2012/0222971 | A1 | 9/2012 | Gillia et al. | |
| 2012/0222972 | A1 | 9/2012 | Chaise et al. | |
| 2012/0325654 | A1 | 12/2012 | Le Gallo et al. | |
| 2013/0043123 | A1 | 2/2013 | Reytier et al. | |
| 2014/0129191 | A1 | 5/2014 | Peigat et al. | |
| 2014/0202877 | A1 | 7/2014 | Greenbaum | |
| 2014/0329161 | A1* | 11/2014 | Laurencin | H01M 8/0267 429/439 |
| 2015/0260342 | A1 | 9/2015 | Elie et al. | |
| 2016/0312956 | A1 | 10/2016 | Chaise et al. | |
| 2016/0327209 | A1 | 11/2016 | Gillia et al. | |
| 2017/0362724 | A1 | 12/2017 | Planque et al. | |
| 2018/0003345 | A1 | 1/2018 | Gillia et al. | |
| 2019/0013539 | A1 | 1/2019 | Reytier et al. | |

FOREIGN PATENT DOCUMENTS

| | | |
|---|---|---|
| JP | 2014-95118 A | 5/2014 |
| WO | 2011110674 A1 | 9/2011 |
| WO | 2012123290 A1 | 9/2012 |
| WO | 2013060869 A1 | 5/2013 |
| WO | 2016146956 A1 | 9/2016 |

OTHER PUBLICATIONS

Jensen, Søren Højgaard, Hydrogen and synthetic fuel production using pressurized solid oxide electrolysis cells, Jul. 24, 2010, International Journal of Hydrogen Energy, pp. 9544-9549 (Year: 2010).*
Preliminary French Search Report for FR 1658750 dated May 11, 2018.
International Search Report for PCT/FR2017/052478 dated Dec. 14, 2017.
Written Opinion for PCT/FR2017/052478 dated Dec. 14, 2017.
Delhomme, Baptiste et al. "Coupling and thermal integration of a solid oxide fuel cell with a magnesium hydride tank" IN: International Journal of Hydrogen Energy; Feb. 2013, vol. 38, No. 11, pp. 4740-4747.
Translation of the Office action for JP2019-515352 dated Apr. 11, 2022.

* cited by examiner

SYSTEM FOR HIGH-TEMPERATURE REVERSIBLE ELECTROLYSIS OF WATER COMPRISING A HYDRIDE TANK COUPLED WITH THE ELECTROLYSER

CROSS-REFERENCE TO RELATED APPLICATIONS

This is a National Stage application of PCT international application PCT/FR2017/052478, filed on Sep. 18, 2017, which claims the priority of French Patent Application No. 16 58750, filed Sep. 19, 2016, both of which are incorporated herein by reference in their entireties.

DESCRIPTION

Technical Field

The present invention relates to the general field of high-temperature electrolysis of water (HTE), and in particular high-temperature steam electrolysis (HTSE).

It also relates to the field of solid-oxide fuel cells (SOFC).

More specifically, the invention relates to the storage of electricity and the delivery, or withdrawal, thereof by way of a reversible electrolysis of water, leading to the production and/or consumption of hydrogen.

Thus, the invention proposes a system for high-temperature reversible electrolysis of water comprising a device forming a reversible electrolyser and a hydride tank thermally coupled with said electrolyser, as well as an associated process of reversible electrolysis.

PRIOR ART

To electrolyse water, it is advantageous to do so at high temperature, typically between 600 and 950° C., because it is more advantageous to electrolyse steam than liquid water (15%), and a portion of the energy needed for the reaction can be supplied by heat, which is less expensive than electricity.

To implement the high-temperature electrolysis of water (HTE), it is known to use a high-temperature solid-oxide electrolyser cell (SOEC), consisting of a stack of basic patterns each comprising a solid-oxide electrolysis cell, consisting of three anode/electrolyte/cathode layers superimposed one on top of another, and metal alloy interconnection plates, also called bipolar plates or interconnectors. A solid-oxide fuel cell (SOFC) consists of the same type of stack of basic patterns.

It should be noted that the interconnection devices, electrical and fluidic, also called interconnectors or interconnection plates, are devices ensuring the series connection from an electrical perspective of each electrochemical cell with a basic pattern in the stack of basic patterns of the high-temperature solid-oxide electrolysers (SOEC) or solid-oxide fuel cells (SOFC), and, in parallel, from a fluidic perspective, thus combining the production of each of the cells. The interconnectors thus ensure the electric current supply and collection functions and define gas circulation compartments, for distribution and/or collection.

More specifically, the interconnectors are designed to ensure both the passage of the electrical current and the circulation of gases in the vicinity of each cell (specifically: steam injected, hydrogen and oxygen extracted for HTE electrolysis; air and fuel including the hydrogen injected and water extracted for a SOFC cell), and to separate the anode and cathode compartments, which are compartments for circulation of gases on the anode and cathode side, respectively, of the cells.

For high-temperature steam electrolysis (HTSE), steam ($H_2O$) is injected into the cathode compartment. Under the effect of the electrical current applied to the cell, the dissociation of water molecules in the form of steam occurs at the interface between the hydrogen electrode (cathode) and the electrolyte: this dissociation produces dihydrogen gas ($H_2$) and oxygen ions ($O^{2-}$). Dihydrogen ($H_2$) is collected and discharged at the outlet of the hydrogen compartment. The oxygen ions ($O^{2-}$) migrate through the electrolyte and recombine to form dioxygen ($O_2$) at the interface between the electrolyte and the oxygen electrode (anode). A draining gas, such as air, can circulate at the anode and thus collect the oxygen generated in gas form at the anode.

To ensure the operation of a solid-oxide fuel cell (SOFC), air (oxygen) is injected into the cathode compartment of the cell and hydrogen is injected into the anode compartment. The oxygen of the air will dissociate into $O^{2-}$ ions. These ions will migrate into the electrolyte, from the cathode to the anode, to oxidise the hydrogen and form water with a simultaneous production of electricity. In a SOFC stack, just like in SOEC electrolysis, steam is found in the dihydrogen ($H_2$) compartment. Only the polarity is inverted.

As an illustration, FIG. 1 shows a schematic view of the principle of operation of a high-temperature solid-oxide electrolyser (SOEC). Such an electrolyser is an electrochemical device for producing hydrogen (and oxygen) under the effect of an electrical current. In these electrolysers, the high-temperature electrolysis of water is performed using steam. Thus, the function of such an electrolyser is to transform the steam into hydrogen and oxygen according to the following electrochemical reaction:

$2H_2O \rightarrow 2H_2 + O_2$.

This reaction occurs electrochemically in the cells of the electrolyser. As schematically shown in FIG. 1, each basic electrolysis cell 1 is formed by a cathode 2 and an anode 4, placed on either side of a solid electrolyte 3. The two electrodes (cathode and anode) 2 and 4 are electronic and/or ionic conductors, made of porous material, and the electrolyte 3 is impervious to gas, an electronic insulator and an ion conductor. The electrolyte 3 may in particular be an anion conductor, and more specifically an anion conductor of $O^{2-}$ ions, and the electrolyser is then referred to as an anion electrolyser, by contrast with proton electrolytes ($H^+$).

The electrochemical reactions occur at the interface between each of the electronic conductors and the ion conductor.

At the cathode 2, the half-reaction is as follows:

$2H_2O + 4e^- \rightarrow 2H_2 + 2O^{2-}$.

At the anode 4, the half-reaction is as follows:

$2O^{2-} \rightarrow O_2 + 4e^-$.

The electrolyte 3, inserted between the two electrodes 2 and 4, is the site of migration of the $O^{2-}$ ions under the effect of the electrical field created by the difference in potential imposed between anode 4 and cathode 2.

As indicated between parentheses in FIG. 1, the steam at the cathode inlet can be accompanied by hydrogen $H_2$ and the hydrogen produced and recovered at the outlet can be accompanied by steam. Similarly, as illustrated with dotted lines, a draining gas, such as air, may also be injected at the inlet to discharge the oxygen produced. The injection of a draining gas has the additional function of acting as a temperature controller.

A basic electrolyser, or electrolysis reactor, consists of a basic cell as described above, with a cathode 2, an electrolyte 3, and an anode 4, and two monopolar connectors, which provide electrical, hydraulic and thermal distribution functions.

To increase the flow rates of hydrogen and oxygen produced, it is known to stack a plurality of basic electrolysis cells one on top of another, separating them with interconnection devices, usually called interconnectors or bipolar interconnection plates. The assembly is positioned between two end interconnection plates that support the electrical and gas supplies of the electrolyser (electrolysis reactor).

A high-temperature solid-oxide electrolyser (SOEC) thus comprises at least one, and generally a plurality of electrolysis cells stacked one on top of another, each basic cell being formed by an electrolyte, a cathode and an anode, the electrolyte being inserted between the anode and the cathode.

As indicated above, the fluidic and electrical interconnection devices that are in electrical contact with one or more electrode(s) generally perform functions of electrical current supply and collection and define one or more gas circulation compartment(s).

Thus, the function of a so-called cathode compartment is to distribute the electrical current and steam as well as to recover hydrogen at the cathode in contact.

The function of a so-called anode compartment is to distribute the electrical current and to recover oxygen at the anode in contact, optionally by means of a draining gas.

FIG. 2 shows an exploded view of basic patterns of a high-temperature solid-oxide electrolyser (SOEC) according to the prior art. This electrolyser comprises a plurality of basic electrolysis cells C1, C2, of the solid-oxide (SOEC) type, alternately stacked with interconnectors 5. Each cell C1, C2 consists of a cathode 2.1, 2.2 and an anode (only anode 4.2 of cell C2 is shown), between which an electrolyte is placed (only electrolyte 3.2 of cell C2 is shown).

The interconnector 5 is a metal alloy component that ensures the separation between the cathode 50 and anode 51 compartments, defined by the volumes between the interconnector 5 and the adjacent cathode 2.1 and between the interconnector 5 and the adjacent anode 4.2, respectively. It also ensures the distribution of the gases to the cells. The injection of steam into each basic pattern occurs in the cathode compartment 50. The collection of the hydrogen produced and the residual steam at the cathode 2.1, 2.2. is carried out in the cathode compartment 50 downstream of the cell C1, C2 after dissociation of the steam by same. The collection of the oxygen produced at the anode 4.2 occurs in the anode compartment 51 downstream of the cell C1, C2 after dissociation of steam by same. The interconnector 5 ensures the passage of the current between the cells C1 and C2 by direct contact with the adjacent electrodes, i.e. between the anode 4.2 and the cathode 2.1.

FIG. 3 shows an exploded view of basic patterns of a solid-oxide fuel cell (SOFC) according to the prior art. The same basic patterns as those of FIG. 2 are implemented for a SOFC fuel cell with cells of basic stacks C1, C2 and interconnectors 5. The cathodes 2.1, 2.2 of the electrolyser described above in reference to FIG. 2 are then used as anodes for a SOFC cell and the anodes e.g. 4.2 are used as cathodes. Thus, for an operation in SOFC cell mode, the injection of air containing oxygen into each basic pattern occurs in the compartment that has become a cathode compartment 51. The collection of water produced at the anode occurs in the compartment that has become an anode compartment 50 downstream of the cell C1, C2, after recombination into water of the dihydrogen $H_2$ injected at the anode 2.2 into each anode compartment 50 upstream of the cell C1, C2 with the $O^{2-}$ ions having transited through the electrolyte 3.2. The current produced in the recombination of water is collected by the interconnectors 5.

As the conditions of operation of a high-temperature solid-oxide electrolyser (SOEC) are very similar to those of a solid-oxide fuel cell (SOFC), the same technological constraints are found: namely, primarily, the mechanical strength at temperatures and thermal cycles of a stack of different materials (ceramic and metal alloy), maintenance of the imperviousness of the anode and cathode compartments, resistance to aging of the metal interconnectors and minimization of ohmic losses at various interfaces of the stack.

A significant constraint is that of best managing the thermal operating conditions of a solid-oxide fuel cell (SOFC) in which the oxidation reaction of hydrogen is highly exothermic, or of a high-temperature water electrolyser (HTE) in which the overall reaction may exothermic, endothermic or generally isothermal (autothermal operation) according to the operating potential.

In particular, for the highly exothermic reaction of a solid-oxide fuel cell (SOFC), it is necessary to provide means for cooling the system. Thus, to allow cooling and to limit the temperature gradient in the stack, without adversely affecting the fuel utilization rate (defined as the percentage of incoming reactants consumed by the reaction in the stack), the main possible adjustment variable is the air flow rate on the cathode side, with respect to the requirement of the electrochemical reaction. While this technique remains relatively acceptable at low pressure, the overconsumption of gas compressors, resulting from the increase in the quantity of gas to be compressed upstream of the SOFC cell, quickly becomes prohibitive for the overall energy efficiency at higher pressures.

Alternative solutions have already been envisaged in the prior art for this type of technology, and in particular for allowing such a cooling of the system during the exothermic oxidation reaction of hydrogen in a SOFC cell.

Thus, there are already a number of patent documents concerning the electrolyser in order to keep the temperature within the acceptable limits of the system. Thus, there are patent documents highlighting the heat exchange between the stack and the enclosure containing it, such as the patent application US 2006/0105213 A1, which proposes extending the interconnector plates in order to form heat exchange fins, or the international application WO 2013/060869 A1, which presents thick interconnector plates profiled so as to improve the thermal transfers by radiation. Other patent documents highlight the possibility of using a heat transfer fluid, distinct from the cathode and anode gases, directly in the stack in order to remove the heat produced, such as the patent application GB 2 151 840.

For the thermal management of a stack at the system level, the American patent application US 2009/0263680 A1 describes the use, in an on-board system, of a non-reactive heat transfer fluid (air, steam, . . . ) injected through the SOFC cell in order to provide thermal inertia to the cells, and thus easily remove reaction heat. The objective is to obtain effective cooling of the cell, with the possibility of producing additional electricity owing to a downstream turbine utilizing the heating of the heat transfer fluid. In addition, a portion of the heat transfer fluid is recycled to the inlet of the cell, to make it possible to preheat the incoming gas.

However, said patent application US 2009/0263680 A1 does not mention utilization of the excess heat produced by the SOFC cell other than by means of the downstream turbine producing the electricity. Moreover, it does not indicate how the heat transfer fluid removes heat from the cell. The invention of said document is specific to on-board systems, therefore low-power systems, by contrast with moderate and/or high-power stationary systems. In addition, the on-board system described in the patent application US 2009/0263680 A1 is not intended to operate at high pressures, but instead uses lightly pressurized ambient air or air pressurized by an air flow around the cell.

In addition, the patent application US 2004/0081859 A1 also describes a SOFC cell capable of storing heat used in a heat storage material in discharge mode, then using it to heat water at the electrolyser in charging mode.

Furthermore, a number of publications concern tests of hydrogen cell systems. As an example, the article entitled "Coupling and thermal integration of a solid-oxide fuel cell with a magnesium hydride tank", B. Delhomme, A. Lanzini, International journal of hydrogen energy, 2013, 38, 4740-4747, envisages the coupling of a hydrogen cell with a hydride tank, while allowing for total recirculation of the unconsumed hydrogen after condensation of the water created by the electrochemical reaction in the cell. It thus appears to be possible to have a hydrogen system conversion rate close to 100%.

Nevertheless, this solution was devised only for low-pressure operation, and is not concerned with recompression of the recirculated hydrogen. The thermal integration therein is limited. An assembly is provided to allow for recovery of heat for desorption, but it involves combustion of the unreacted hydrogen at the outlet of the cell, rather than targeting a conversion rate of 100%.

There is still a need to improve the management of thermal operating conditions of a high-temperature water electrolyser (HTE) and a solid-oxide fuel cell (SOFC), in particular in order to overcome the exothermicity of the envisaged reactions, in particular in a pressurized operation.

DESCRIPTION OF THE INVENTION

The invention is intended to at least partially address the requirements mentioned above and overcome the disadvantages of the prior art.

The invention thus relates, according to one of its aspects, to a system for high-temperature reversible electrolysis of water, characterized in that it comprises:
  a device forming a high-temperature reversible electrolyser, configured to operate in a solid-oxide electrolyser (SOEC) mode, for the production of hydrogen and thus the storage of electricity, and/or according to a solid-oxide fuel cell (SOFC) mode, for the consumption of hydrogen and thus the withdrawal of electricity, said reversible electrolyser being configured to operate under a pressure of between 2 and 15 bars, and in particular between 8 and 12 bars,
  a hydride tank, thermally coupled with said reversible electrolyser, configured to store hydrogen in the form of hydrides in the solid-oxide electrolyser (SOEC) mode of said reversible electrolyser and/or to release hydrogen in the solid-oxide fuel cell (SOFC) mode of said reversible electrolyser,
  the system being configured to allow, when the reversible electrolyser is configured to operate in a solid-oxide electrolyser (SOEC) mode, a recovery of the heat released by the hydride tank during the absorption of hydrogen in order to produce pressurized steam intended to enter the reversible electrolyser, and to allow, when the reversible electrolyser is configured to operate in a solid-oxide fuel cell (SOFC) mode, a recovery of the heat released by the streams leaving the reversible electrolyser to enable the desorption of hydrogen from the hydride tank.

Advantageously, the operation of the system according to the invention makes it possible to limit gas compression work, in particular hydrogen compression, because only the liquid water is compressed. The system according to the invention may also comprise a compressor intended to compress the liquid water. This thus makes it possible to improve efficiency with respect to a system in which the reversible electrolyser is operated at atmospheric pressure. The operation of the electrolyser under pressure also makes it possible to improve its performance, in particular by reducing the diffusion limit phenomena of the reactive species in the cells.

The reversible electrolysis system according to the invention may also comprise one or more of the following features, taken alone or in any possible technical combination.

The terms "reversible electrolysis" and "reversible electrolyser" respectively mean that the electrochemical high-temperature electrolysis reaction of water (THE) can be performed in one direction and/or in the other, namely that it can allow for the production of hydrogen and/or the consumption of hydrogen according to the mode of operation of the system, and that the reversible electrolyser can operate in a storage mode and/or a withdrawal mode. More specifically, in the storage mode, it allows for the production of hydrogen and therefore the storage of electrical energy. Conversely, in the withdrawal mode, it allows for the consumption of hydrogen and therefore the withdrawal (or the delivery) of electrical energy.

In addition, throughout the description, the terms "upstream" and "downstream" should be considered with respect to the direction of flow of the stream considered, namely from upstream to downstream.

Of course, the system according to the invention may have a modular design. In particular, it may comprise a plurality of reversible electrolysers and/or hydride tanks. Thus, all or some of said electrolysers and/or hydride tanks may be activated in particular according to the desired power range.

The reversible electrolyser can very specifically comprise a stack of basic solid-oxide electrochemical cells each formed by a cathode, an anode, and an electrolyte inserted between the cathode and the anode, and a plurality of electrical and fluidic interconnectors each arranged between two adjacent basic cells.

Each interconnector may be conventional, as described in the prior art, or a so-called "three-stream" interconnector. In particular, each interconnector may integrate a stack architecture allowing for the heat exchange between the cathode and anode gases with a third distinct fluid acting as a heat transfer fluid. This heat transfer fluid can circulate in the enclosure, on the condition that the stack has an architecture allowing for an appropriate heat exchange, as proposed, inter alia, in the patent application US 2006/0105213 A1 or the international application WO 2013/060869 A1, described above. Said heat transfer fluid can also circulate in the stack in distinct channels, as proposed in the patent application GB 2 151 840 A, described above. It should also be noted that the enclosure makes it possible to work under pressure, in particular in accordance with the guideline DESP97/23/CE making it possible to work at between 2 and 15 bars.

In addition, the reversible electrolyser can be configured to operate in a solid-oxide electrolyser (SOEC) mode, and the system can then comprise a steam generator, intended to produce steam for the reversible electrolyser by means of the heat released by the hydride tank, during absorption of the hydrogen, and supplied to the steam generator by means of a heat transfer fluid.

The system can also comprise one or more heat exchangers allowing the water at the inlet of the system to be preheated and/or the steam entering the reversible electrolyser to be superheated, by means of the hydrogen and oxygen streams leaving the reversible electrolyser. The system may in particular comprise heat exchangers upstream and downstream of the steam generator for allowing the water at the inlet of the system to be preheated and the steam entering the reversible electrolyser to be superheated, respectively, by means of the hydrogen and oxygen streams leaving the reversible electrolyser.

The system may also comprise a condenser, coupled to a phase separator, intended to receive the unreacted steam in the reversible electrolyser and the dihydrogen produced by the reversible electrolyser and to condense the unreacted water so that it can be recycled in the system. The dihydrogen produced can then be collected in the phase separator and sent to the hydride tank.

The system may also comprise a compression pump, intended to compress the water at the inlet of the system to a pressure of between 2 and 15 bars, and in particular between 8 and 12 bars.

The system may also comprise an electrical heating element upstream of the reversible electrolyser, providing an additional superheating of the steam, in particular up to 800° C.

The system may also comprise a dryer, upstream of the hydride tank and downstream of the condenser, intended to allow the humidity contained in the dihydrogen to be removed before storage in the hydride tank.

The system may also comprise a cooling unit connected to the condenser, upstream of the phase separator, intended to provide the condensation of the unreacted steam coming from the reversible electrolyser.

In addition, the reversible electrolyser may also be configured to operate in a pressurized solid-oxide fuel cell (SOFC) mode, and the system may then comprise at least one heat exchanger, intended to preheat at least one stream entering the reversible electrolyser by means of at least one stream leaving the reversible electrolyser.

The reversible electrolyser can be configured to operate in a solid-oxide fuel cell (SOFC) mode, and the system may also comprise at least one heat exchanger, intended to recover the high-temperature heat coming from at least one stream leaving the reversible electrolyser by means of at least one heat transfer fluid, in particular to allow the desorption of the hydrogen from the hydride tank.

Advantageously, there is no depressurization between the solid-oxide fuel cell (SOFC) mode and the solid-oxide electrolyser (SOEC) mode.

The reversible electrolyser may be configured to operate in a solid-oxide fuel cell (SOFC) mode, and the system may be a "compressed air recirculation system", consisting of a dihydrogen circuit and a primary air circuit.

The reversible electrolyser may be configured to operate in a solid-oxide fuel cell (SOFC) mode, and the system may also be a "three-stream system", consisting of a dihydrogen circuit, a primary air circuit and a cooling circuit using a "three-stream" interconnector.

The dihydrogen circuit may comprise:
means for mixing the hydrogen coming from the hydride tank with the total recycling of the unconsumed hydrogen in the reversible electrolyser over a pressure range of 2 to 15 bars,
a heat exchanger, intended to preheat the dihydrogen stream entering the reversible electrolyser by means of the dihydrogen stream leaving the reversible electrolyser,
a heat exchanger, forming a heat recovery element, intended to recover high-temperature heat from the dihydrogen stream leaving the reversible electrolyser by means of at least one heat transfer fluid.

The system may also comprise a heat exchanger, intended to cool the dihydrogen stream leaving the heat exchanger, forming a heat recovery element, via the hydrogen stream leaving a phase separator, allowing for recovery of the water produced.

In the case of a "compressed air recirculation system", the primary air circuit may comprise:
an air compressor for providing air at between 2 and 15 bars,
a heat exchanger, intended to preheat the air stream entering the reversible electrolyser by means of the air stream leaving the reversible electrolyser,
a heat exchanger, forming a heat recovery element, intended to recover high-temperature heat coming from the air stream leaving the reversible electrolyser by means of at least one heat transfer fluid.

The system may also comprise means for mixing the air stream leaving the heat exchanger, forming a heat recovery element, with supplemental oxygen forming a total stream of air entering the reversible electrolyser at a pressure of 2 to 15 bars.

The system may also comprise:
a heat exchanger and a cooling device, making it possible to cool the total air stream mixed by mixing means,
a compression pump, making it possible to compress the air leaving the cooling device before injection into the heat exchanger for preheating it. This pump makes it possible to compensate for the head losses of the system and to raise the pressure to the correct input level (2 to 15 bars).

In the case of a "three-stream" system, the primary air circuit may comprise:
an air compressor for providing air at between 2 and 15 bars,
a heat exchanger, intended to preheat the compressed air stream entering the reversible electrolyser by means of the air stream leaving the reversible electrolyser,
a heat exchanger, forming a heat recovery element, intended to recover high-temperature heat coming from the air stream leaving the reversible electrolyser by means of at least one heat transfer fluid.

In the case of a "three-stream" system, the cooling circuit may also comprise:
a heat exchanger, intended to preheat the pressurized heat transfer stream entering the reversible electrolyser by means of the hot stream leaving the reversible electrolyser,
a heat exchanger, forming a heat recovery element, intended to recover high-temperature heat coming from the hot stream leaving the reversible electrolyser by means of at least one heat transfer fluid,
a heat exchanger and a cooling device, also designated as a supercooling device, intended to cool the hot stream leaving the heat exchanger, a compression pump, intended to compress the stream leaving the heat exchanger and the supercooling device, to form a fluid stream compressed over a range of 2 to 15 bars in order to cool the hot stream leaving the heat exchanger. Said pump makes it possible to compensate only for the head losses of the system and to raise the pressure to the correct input level (2 to 15 bars).

In addition, the invention relates, according to another of its aspects, to a process for storing electricity and/or for withdrawing electricity by high-temperature reversible electrolysis of water, characterized in that it is implemented by means of a system for high-temperature reversible electrolysis of water as defined above, and in that it comprises the steps of:

when the pressurized reversible electrolyser operates in a solid-oxide electrolyser (SOEC) mode, recovering the heat released by the hydride tank during absorption of the hydrogen in order to produce pressurized steam intended to enter the reversible electrolyser, and when the pressurized reversible electrolyser is configured to operate in a solid-oxide fuel cell (SOFC) mode, recovering the heat released by the stream(s) leaving the reversible electrolyser in order to allow the desorption of the hydrogen from the hydride tank.

The process may be implemented according to an electricity storage mode, the high-temperature reversible electrolyser being configured to operate in a solid-oxide electrolyser (SOEC) mode, and the process can comprise the step of producing the high-temperature electrolysis reaction of the pressurized steam in order to produce hydrogen and thus store electricity.

The process can in particular be implemented according to the storage mode by means of a system for high-temperature reversible electrolysis of water, and can comprise the following series of steps:

introducing the total water of the system, comprising the injection water and the recycled water from the phase separator, into the compression pump to a pressure of between 2 and 15 bars, and in particular between 8 and 12 bars, circulating the total water of the system through heat exchangers to allow for preheating of the water at the inlet of the system by means of hydrogen and oxygen streams leaving the reversible electrolyser, introducing water at the inlet of the system into the steam generator, to produce pressurized steam intended for the reversible electrolyser by means of the heat released by the hydride tank during absorption of the hydrogen, and supplied to the steam generator by a heat transfer fluid, circulating the steam through heat exchangers to allow for superheating of the steam before it enters the reversible electrolyser, by means of the hydrogen and oxygen streams leaving the reversible electrolyser, additional superheating of the steam to reach the working temperature of the electrolyser by using an electrical heating element, introducing pressurized steam into the reversible electrolyser in order to produce hydrogen and oxygen streams, cooling the hydrogen and oxygen streams by means of heat exchangers, condensing the unreacted pressurized steam in the phase separator to produce the recycling water reintroduced into the system, storing the hydrogen produced, dried, in the hydride tank.

Advantageously, there is no compression of the hydrogen between the electrolyser and the tank.

The process may also be implemented according to an electricity withdrawal mode, the high-temperature reversible electrolyser being configured to operate according to a pressurized solid-oxide fuel cell (SOFC), and the process may comprise the step of producing the inverse reaction of high-temperature electrolysis of the steam in order to consume the hydrogen and thus withdraw the electricity.

The process may also particularly be implemented according to the withdrawal mode by means of a "compressed air recirculation system" for high-temperature reversible electrolysis of water, and may comprise the following series of steps:

for the dihydrogen circuit:

mixing the hydrogen coming from the hydride tank at the targeted pressure of 2 to 15 bars, with the total recycling of the unconsumed hydrogen in the reversible electrolyser by way of mixing means, injecting the total hydrogen through the heat exchanger allowing it to be preheated by the hydrogen stream leaving the reversible electrolyser, injecting the total hydrogen into the reversible electrolyser for the consumption thereof and the production of water, electricity and heat, cooling the hydrogen stream leaving the reversible electrolyser by the preheating heat exchanger, cooling the hydrogen stream leaving the preheating heat exchanger by the heat exchanger, forming a heat recovery element, making it possible to recover heat by exchanging it with a heat transfer fluid, separating the hydrogen stream from the water stream produced, coming from the condenser, recycling the unconsumed hydrogen by recompressing it only for the value of the head losses, for the primary air circuit:

injecting air leaving the reversible electrolyser through the cooling heat exchanger in order to be cooled by the compressed air entering the reversible electrolyser, injecting the air leaving the cooling heat exchanger through the heat exchanger, forming a heat recovery element, through which a heat transfer fluid passes, mixing the air leaving the heat exchanger, forming a heat recovery element, by mixing means with an additional compressed air stream, injecting said mixture into a heat exchanger, then a cooling device, then a compression pump in order to compensate for the head losses and to obtain compressed air injected into said cooling heat exchanger downstream of the mixing means, injecting air coming from the cooling heat exchanger into the heat exchanger to be preheated, then injecting it into the reversible electrolyser at the targeted pressure of 2 to 15 bars.

The process may also particularly be implemented according to the withdrawal mode by means of a "three-stream system" for high-temperature pressurized reversible electrolysis of water, and may comprise the following series of steps:

for the dihydrogen circuit:

mixing the hydrogen coming from the hydride tank with the total recycling of unconsumed hydrogen in the reversible electrolyser by way of mixing means, injecting the total hydrogen at the targeted pressure of 2 to 15 bars through the heat exchanger, allowing it to be preheated by the hydrogen stream leaving the reversible electrolyser, injecting the total hydrogen at the targeted pressure of 2 to 15 bars into the reversible electrolyser for the consumption thereof and the production of water, electricity and heat, cooling the hydrogen stream leaving the reversible electrolyser by the preheating heat exchanger, cooling the hydrogen stream leaving the preheating heat exchanger by the heat exchanger, forming a heat recovery element, allowing the heat to be recovered by exchanging it with a heat transfer fluid, separating the hydrogen stream from the water stream produced, coming from the phase separator, recycling the unconsumed hydrogen by recompressing it only for the value of the head losses of the assembly, for the primary air circuit:

injecting ambient air into a compression pump to a pressure of between 2 and 15 bars, and in particular 8 and 12 bars, preheating the air entering the preheating heat exchanger by means of the air stream leaving the reversible electrolyser, injecting the preheated air entering the reversible electrolyser at the target pressure, cooling the air leaving the reversible electrolyser in the preheating heat exchanger, cooling the air leaving the preheating heat exchanger through the heat exchanger, forming a heat recovery element, in order to obtain heat by means of at least one heat transfer fluid, injecting the air leaving the heat exchanger, forming a heat recovery element, into a gas turbine for ejecting the outgoing air, cooling circuit:

cooling the hot stream leaving the reversible electrolyser through the preheating heat exchanger by the fluid entering the reversible electrolyser, cooling the stream leaving the preheating heat exchanger in the heat exchanger, forming a heat recovery element, by means of at least one heat transfer fluid, total cooling of the stream leaving the heat exchanger, forming a heat recovery element, in a heat exchanger by the recompressed fluid stream, injecting the stream leaving the heat exchanger through which the recompressed fluid stream passes into a cooling device, also designated as a supercooling device, then a compression pump, preheating the stream leaving the compression pump by the stream leaving the reversible electrolyser before it enters the reversible electrolyser at the target pressure of 2 to 15 bars, and in particular 8 to 12 bars.

The pressurized reversible electrolysis system and the electrolysis process according to the invention may comprise any one of the features indicated in the description, taken alone or according to any technically possible combination with other features.

BRIEF DESCRIPTION OF THE DRAWINGS

The invention can be better understood upon reading the following detailed description of non-limiting examples of embodiments thereof, as well as the examination of the schematic and partial figures of the appended drawing, wherein.

In all of these figures, the same references may designate identical or equivalent elements.

In addition, the different portions shown in the figures are not necessarily shown according to a uniform scale, in order to make the figures more legible.

DETAILED DESCRIPTION OF SPECIFIC EMBODIMENTS

Figure 1:
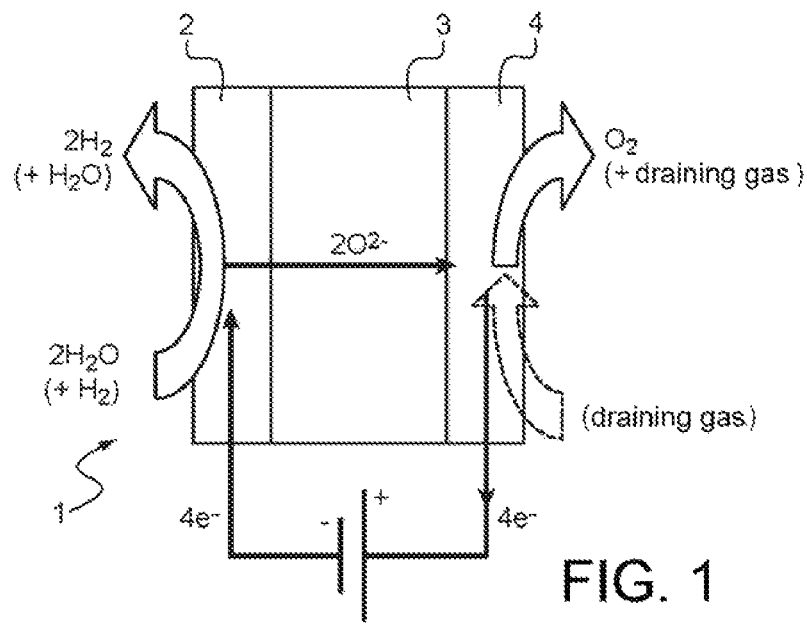
FIG. 1 is a schematic view showing the principle of operation of a high-temperature solid-oxide electrolyser (SOEC)
Figure 2:
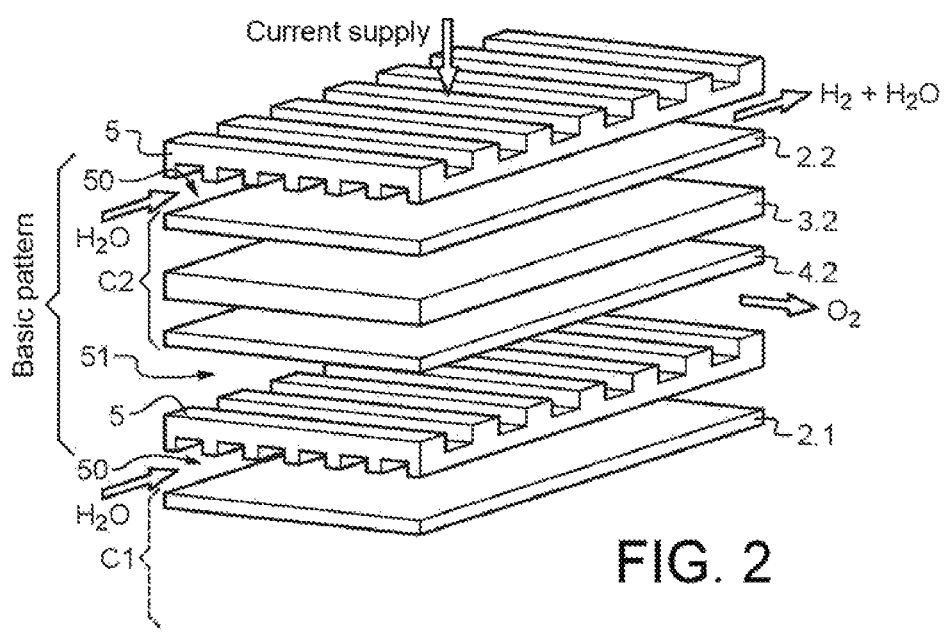
FIG. 2 is a schematic exploded view of a portion of a high-temperature solid-oxide electrolyser (SOEC) comprising interconnectors according to the prior art.
Figure 3:
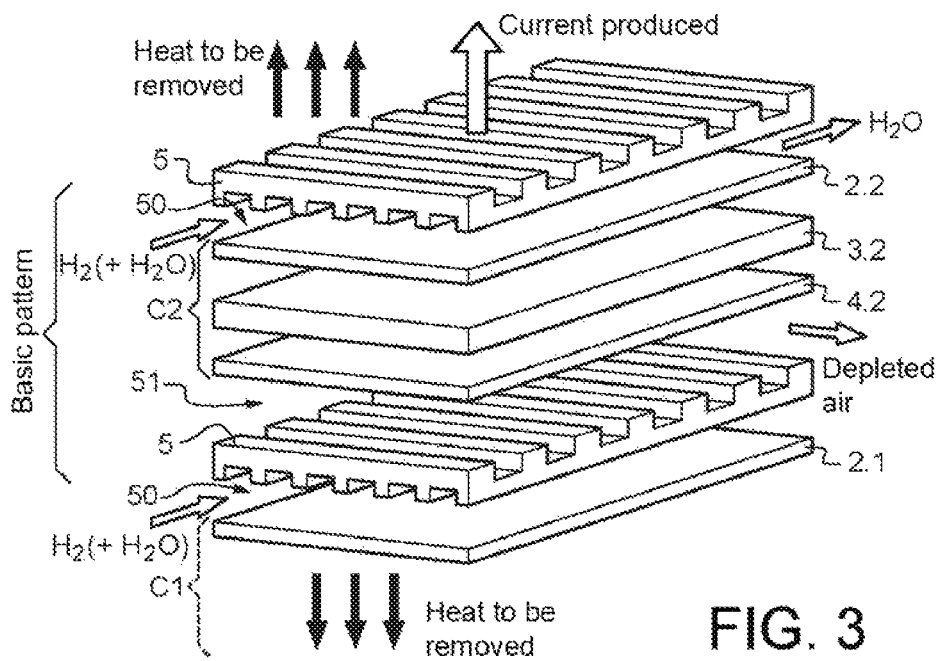
FIG. 3 is a schematic exploded view of a portion of a solid-oxide fuel cell (SOFC) comprising interconnectors according to the prior art.

FIGS. 1 to 3 have already been described above in the part concerning the prior art and the technical context of the invention.

It is specified that, for all of the figures, the symbols and arrows indicating the supply of steam $H_2O$, distribution and recovery of dihydrogen $H_2$, oxygen $O_2$, air and the electric current, are shown for the purposes of clarity and precision, in order to illustrate the operation of the devices represented.

In addition, it should be noted that all of the constituents (anode/electrolyte/cathode) of a given electrolysis cell are ceramic. The temperature of operation of a high-temperature electrolyser is typically between 600 and 1000° C.

Figure 4:
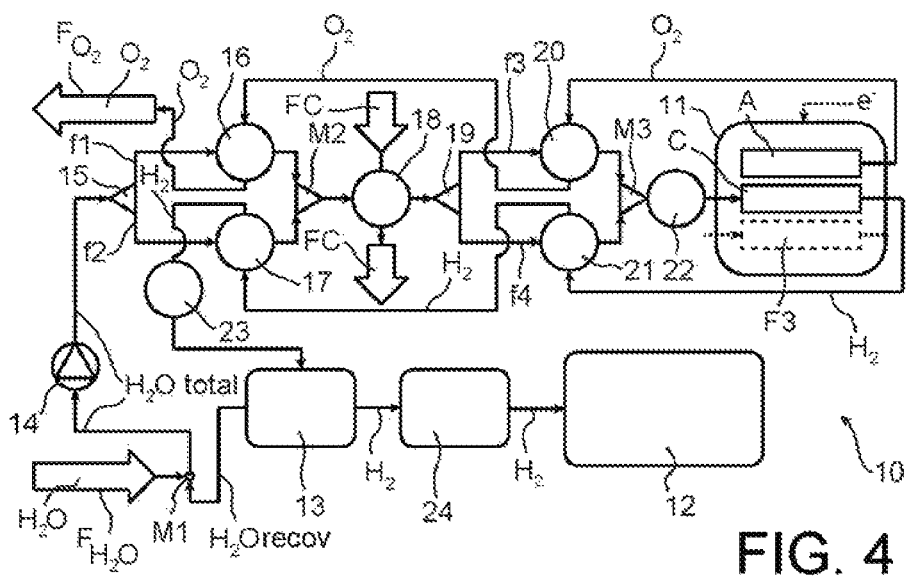
FIG. 4 is a block diagram showing an example of a system for high-temperature reversible electrolysis of water according to the invention, comprising a high-temperature reversible electrolyser, operating according to a solid-oxide electrolyser (SOEC) mode.

In reference to FIG. 4, in the form of a block diagram, an example is shown of a system 10 for high-temperature reversible electrolysis of water according to the invention, comprising a high-temperature reversible electrolyser 11, operating according to a solid-oxide electrolyser (SOEC) mode for the production of hydrogen and thus the storage of electricity. In addition, the system 10 operates under a pressure of between 2 and 15 bars, or even between 8 and 12 bars.

The reversible electrolyser 11 is thermally coupled with a hydride tank 12, making it possible to store hydrogen in the form of hydrides. The principle of operation of the system 10 according to the invention shown in FIG. 4 will be described below in the portion concerning the storage mode.

The system 10 for high-temperature reversible electrolysis of water according to the invention may have multiple possibilities for use.

In particular, and in a non-limiting manner, the system 10 may operate in a reversible mode, i.e. both for storage and withdrawal of electricity. In this case, a massive storage of electricity can be achieved before it is delivered by reversibility of the electrolysis process.

The system 10 may also operate in a non-reversible mode, i.e. according to an operation in which it is dedicated to only one of the two possible directions of the electrochemical electrolysis reaction.

More specifically, the system 10 may thus operate only in storage mode: in such a case, the system is similar to a station dedicated to the production of hydrogen filling the hydride tank 12 as well as to the supply of oxygen or enriched air. In this case, the system may, for example, act as a charging station for a hydrogen vehicle, such as a construction vehicle.

The system 10 may also operate only in withdrawal mode: in such a case, the system is similar to a station dedicated to the production of electricity, capable of being supplied with hydrogen from the hydride tank 12 and/or another process. If hydrogen coming from another process is used, it may be injected via the hydride tank, in which case the latter acts as a buffer tank, or directly downstream of the hydride tank. If hydrogen from a hydride storage is not used, the heat recovered at exchangers 31, 39 (case of the air recirculation system, FIGS. 6 and 7) or 31, 49 and 91 (case of the 3-stream system, FIGS. 11, 12 and 13) must be removed, and can be used in other processes outside the system.

When the system 10 is used according to a non-reversible mode of operation, either to store electricity or to withdraw electricity, certain elements of the system 10 may not be used, in particular certain exchanger networks.

Below, in reference to FIGS. 4 to 16, the two main modes of operation of the system 10 according to the invention will now be described, namely the storage mode and the withdrawal mode. More specifically, FIGS. 4 and 5 concern the mode of operation of the system 10 according to the storage mode, and FIGS. 6 to 16 concern the operation of the system 10 according to the withdrawal mode.

Storage Mode

The electricity storage mode of the system 10 according to the invention uses the reversible electrolyser 11 in an operation configuration of a solid-oxide electrolyser (SOEC). As shown in FIG. 4 and according to the description, above, of this type of electrolyser, the SEOC electrolyser 11 comprises a stack of basic solid-oxide electrochemical cells each formed by a cathode, which are generally referred to as cathode C of the SOEC electrolyser 11, an anode, which are generally referred to as anode A of the SOEC electrolyser 11, an electrolyte inserted between the cathode and the anode of each cell, and a plurality of electrical and fluidic interconnectors each arranged between two adjacent basic cells, which are generally referred to as a three-stream interconnector F3 of the SOEC electrolyser 11. However, preferably, said three-stream interconnector F3 is not used in storage mode of the system 10 according to the invention. Also, the parts related to the operation of the three-stream interconnector F3 are represented by dotted lines in FIG. 4.

Solid-oxide electrolysers (SOEC) are capable of operating with or without air scavenging on the oxygen production side. They are thus capable of providing both almost pure oxygen and enriched air, depending on what is needed. In the example of system 10 described here, it is considered that there is no air scavenging in storage mode, thereby avoiding the compression of said gas for the envisaged operation under pressure, and therefore the production of compressed and almost pure oxygen is obtained.

The storage mode of the system 10 according to the invention is intended to produce pressurized hydrogen, which is stored in the hydride tank 12, based on electricity.

Advantageously, the SOEC electrolyser 11 is configured to operate under a pressure ranging from 2 to 15 bars, or even 8 to 12 bars. Indeed, working under pressure in the SOEC electrolyser 11 makes it possible to limit the work of compressing the hydrogen created, because compressing liquid water requires much less energy than compressing hydrogen.

It is, however, possible to envisage working on the electrolyser at a pressure different from that of the storage. This alternative would, however, require a compressor (case in which the storage is at a pressure above the electrolyser) or an expansion valve (case in which the storage is at a lower pressure) between the electrolyser and the storage. The head from absorption of hydrogen in the hydride would in every case be used to meet the needs of the steam generator.

The operation in storage mode is described below. Thus, as shown in FIG. 4, demineralized water $H_2O$, represented by arrow $F_{H2O}$, is mixed in M1 with the recovery water $H_2O_{recov}$ of the process, from the phase separator 13. Then, all $H_2O_{total}$ of said water $H_2O+H_2O_{recov}$ is compressed by a compression pump 14 to a working pressure of between 2 and 15 bars, or even 8 and 12 bars.

The total water $H_2O_{total}$ is then separated into two streams f1 and f2 by a separator 15, each stream f1, f2 being respectively preheated to saturation by heat exchangers 16 and 17, respectively, through which cooled oxygen $O_2$ and hydrogen $H_2$ streams pass.

The water preheated through the two heat exchangers 16 and 17 is then remixed in M2, then brought to a boil in a steam generator 18 by means of the heat recovered in the hydride tank 12, during absorption of the hydrogen (for example, around 75 kJ/mole for a hydride of the magnesium hydride type), by means of a heat transfer fluid FC. It is also appropriate to choose a metal hydride and a pressure range of the system 10 such that the heat released by the hydride is at a temperature above that of the boiling point of water at the pressure considered at the inlet of the electrolyser, for example magnesium hydride is at sorption equilibrium at 380° C. at 10 bars.

The steam is then separated again into two streams f3 and f4 by a separator 19, each stream f3, f4 respectively being superheated to between 670 and 750° C. by heat exchangers 20 and 21, respectively, through which hot oxygen $O_2$ and hydrogen $H_2$ streams pass, leaving the SOEC electrolyser SOEC 11.

The two streams f3 and f4 of superheated steam are then remixed in M3, then an electrical heating element 22 provides the final superheating of the steam to 700 to 800° C. of operation of the SOEC electrolyser 11 before entering it.

The oxygen $O_2$ and hydrogen $H_2$, respectively from anode A and cathode C, are first cooled, respectively, by heat exchangers 20 and 21 with the steam at the inlet of streams f3 and f4, then respectively by heat exchangers 16 and 17 with the water of streams f1 and f2.

The oxygen $O_2$ is then stored or removed, as represented by arrow $F_{O2}$.

Concerning the hydrogen $H_2$, a condenser 23 ensures the condensation of the unreacted steam, and this water is then collected in the phase separator 13 before being sent to the start of the process at M1 for recycling thereof. The drying of the hydrogen $H_2$ is completed in a dryer 24 before being sent to the hydride tank 12 to be stored therein, which then produces heat recovered by the heat transfer fluid FC loop for the steam generator 18. The dryer 24 may be of different types, such as a silica gel or a cryogenic trap. However, it must be capable of removing the humidity present in the hydrogen $H_2$ before it enters the hydride storage tank 12. Indeed, as said compounds react strongly with water, it may damage the tank 12 and produce a strong release of heat.

It should be noted that the system 10 may also operate with a SOEC electrolyser 11 in exothermic mode, namely the gases leaving the cells are hotter than those entering them, in which case the electrical heating element 22 is not necessary during operation of the SOEC electrolyser 11.

It should be noted that the system 10 may also operate with a SOEC electrolyser 11 in endothermic mode, namely the gases leaving the cells are colder than those entering them, in which case the electrical heating element 22 operates at a higher power in order to compensate.

Advantageously, the thermal coupling between the SOEC electrolyser 11 and the hydride tank 12 provides numerous advantages. In particular, it makes it possible to supply the energy requirement of the steam generator 18 and thus makes it possible not to have to use a source outside the system 10, of the electrical type or by gas combustion, thereby making it possible to increase the efficiency of the electrolysis process in storage mode. In addition, such a thermal coupling also makes it possible to avoid having to remove heat coming from the hydride tank 12, as is the case with the coupling between the hydride tank and the low-temperature electrolysis. This would otherwise have a non-negligible energy cost, which could reduce the efficiency of the process if no means for storing said heat is used, in which case a heat removal element, such as an air-cooling tower, would be necessary. Advantageously, the electrolysis is performed under pressure in order to avoid any compression of hydrogen before storage in the tank.

Example of an Embodiment

The high-temperature reversible electrolyser 11 comprises an enclosure containing stacks.

An example of an embodiment of a SOEC electrolyser 11 thermally coupled to a hydride tank 12 in storage mode will now be described.

The various values cited in the following example result from simulations performed using the ProsimPlus software based on thermodynamic models of electrolysis cells as well as auxiliary elements (pumps, converters, etc.). The objective of the system 10 in this example is to supply hydrogen absorbed on magnesium hydride $MgH_2$. The storage of hydrides in the hydride tank 12 occurs at a pressure of 10 bars. The power range of the system in production mode is between 115 and 116.5 kW, and the range of system efficiencies obtained is between 86.4 and 87.5% LHV (ratio between the lower heating value of the gaseous hydrogen created and the power consumption of the system). The efficiency of the electrolyser stack alone is 97.5% LHV.

The system 10 therefore comprises a storage of hydrogen by hydrides of the magnesium hydride $MgH_2$ type. It absorbs cold hydrogen, at around 35° C., under a pressure of 10 bars, thereby releasing an energy of 75 kW/mole $H_2$ in the form of heat.

The heat released by the hydrogen absorption is recovered on a heat transfer fluid FC loop, comprising oil, in order to supply the steam generator 18. The utilization rate in the electrolyser 11 is kept sufficiently high, at around 60%, for the storage at the hydride tank 12 to generate enough heat to completely supply the steam generator 18, namely total boiling of water with superheating of 10° C.

The electrolyser 11 is controlled at the thermoneutral voltage in this example, with flow rates within the acceptable limits of the cells, i.e. 12 to 48 NmL/min/cm². There is therefore no scavenging on the anode side, as the oxygen produced is substantially pure. There is no problem of cooling in the cells, as the thermoneutral system makes it possible to obtain a temperature at the outlet of the electrolyser 11 equal to that at the inlet. The third channel of the three-stream interconnector, represented by F3 in FIG. 4, is not used here. The restriction to the thermoneutral voltage has the effect of limiting the power range accessible to the system in storage mode with respect to an operation in endothermic or exothermic mode, offering a wider accessible range.

In the computations of the efficiency of the system 10, the total combustion heat capable of potentially being released by the hydrogen produced with (HHV) or without (LHV) water condensation generated was compared with the electrical energy (AC) required for its production at the level of the whole system. The lower (LHV) and higher (HHV) heating values of hydrogen are respectively 244 and 286 kJ/mol.

Figure 5:
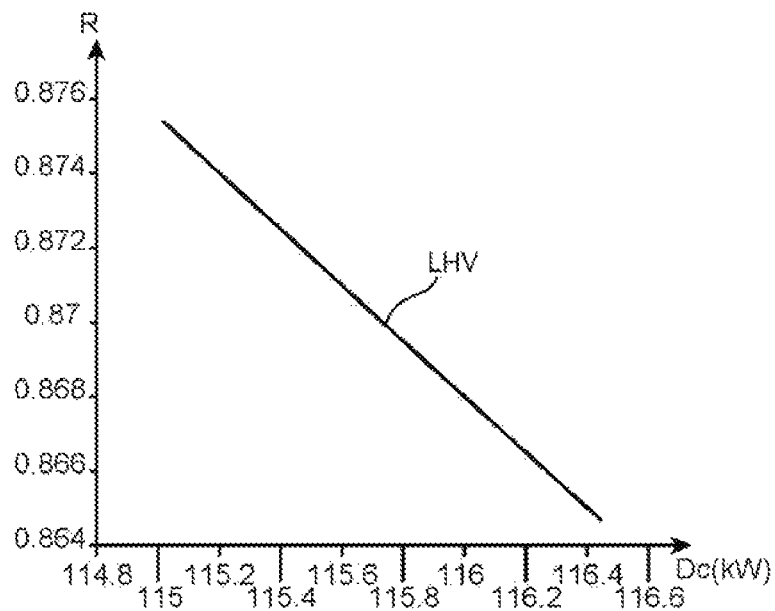
FIG. 5 shows, in a graph, the change in the LHV efficiency of a system according to the invention operating in hydrogen production mode and a nominal value of 116 kW AC, as a function of the total electric power consumed.

FIG. 5 shows, in a graph, the change in the efficiency R of the system 10 operating in hydrogen production mode for a system with a nominal value of 116 kW AC, as a function of the total electrical power consumed Dc, expressed in kW AC.

The efficiency R for the LHV curve is more specifically calculated with the following formula:

$$R = [\text{flow rate of } H_2 \text{ created} * LHV]/\text{Electrical consumption.}$$

The electrical consumptions taken into account in the efficiencies comprise the consumption of the electrolysis cells themselves, to which the consumptions of auxiliary elements (pumps, heating and cooling units and power electronics) are added.

Thus, the assembly of the system 10 in storage mode makes it possible to efficiently utilize the heat from the hydrogen absorption on the hydride, by providing a heat source for supplying the steam generator 18, thereby allowing for electrical consumption savings of at least 15% by comparison with the processes using low-temperature electrolysis (PEM, alkaline), which must remove said heat. This, combined with the higher electrical efficiency of high-temperature electrolysis by comparison with low-temperature processes, explains the high values indicated for the efficiencies.

The efficiency is also higher than a conventional system because it produces a hydrogen that is absorbed in the hydride, thereby releasing heat used to supply the steam generator. In the case of a system without heat supplied by the hydride, it would be necessary to supply the required heat by the steam generator to the system by means of a hot utility, which would reduce the LHV and HHV efficiencies by around 15 and 17 points, respectively.

Withdrawal Mode

The electricity withdrawal mode of the system 10 according to the invention uses the reversible electrolyser 11 in an operation configuration of a solid-oxide fuel cell (SOFC).

In this withdrawal mode, the objective is to consume hydrogen in the fuel cell 11 under a pressure of between around 2 and 15 bars, with the objectives of providing electricity at a higher efficiency, and optionally providing low-temperature heat making it possible to supply a heating network, such as that of a residence, an agricultural dryer, inter alia.

In the withdrawal mode, the system 10 may take the form of two distinct systems, referred to respectively as an air recirculation system and a three-stream system. They are described below.

Air Recirculation System

Figure 6:
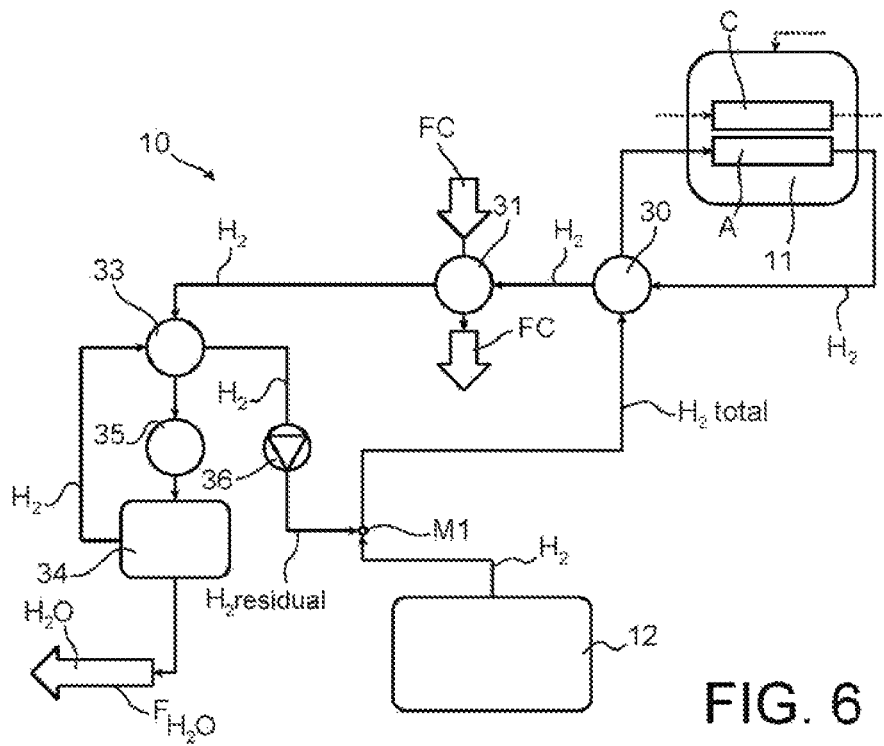
FIG. 6 is a block diagram showing the dihydrogen circuit of an example of a so-called "compressed air recirculation" system for high-temperature reversible electrolysis of water according to the invention, comprising a high-temperature reversible electrolyser, operating according to a solid-oxide fuel cell (SOFC) mode.
Figure 7:
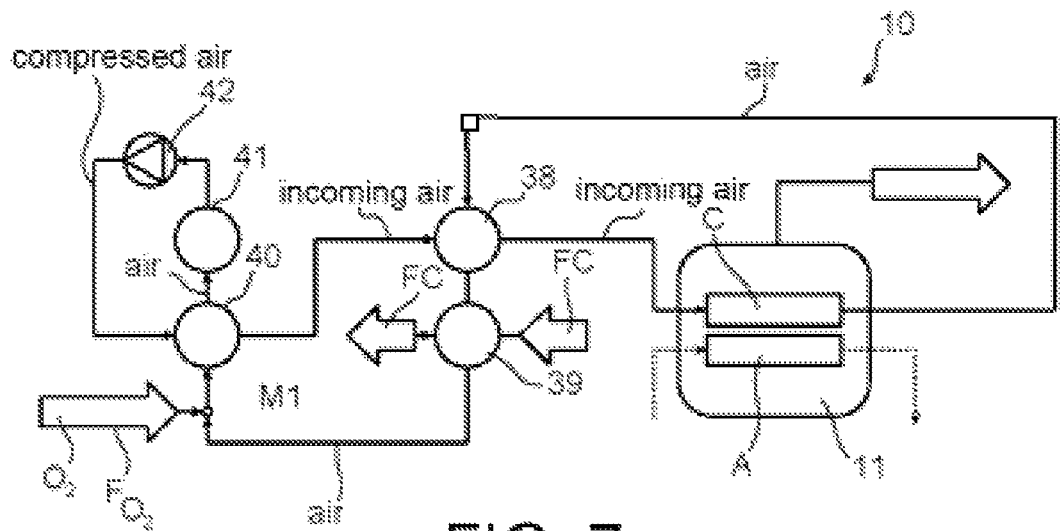
FIG. 7 is a block diagram showing the primary air circuit of the system of FIG. 6.

This system 10 is illustrated in FIGS. 6 and 7. In this case, the system 10 does not have a three-stream interconnector. As can be seen in FIGS. 6 and 7, the fuel cell 11 comprises an anode A and a cathode C, as described above, but not the third heat transfer fluid channel.

In said system 10, the cooling of the fuel cell 11 is provided solely by the compressed air flow on the cathode side, which is consequently designed to be large due to the exothermicity of the hydrogen oxidation reaction. The desorption of hydrogen in the hydride tank is ensured by the collection of heat from the outgoing fluids.

Below, the operation of the dihydrogen $H_2$ circuit will be described, followed by a description of the operation of the primary air circuit.

Dihydrogen $H_2$ Circuit

This circuit is illustrated in reference to FIG. 6. In said FIG. 6, the portions represented with dotted lines refer to the primary air circuit described below in reference to FIG. 7. Advantageously, the dihydrogen circuit $H_2$ forms a loop allowing the unconsumed hydrogen to be recycled in the fuel cell 11. Thus, a conversion of close to 100% of the hydrogen is obtained.

The operation of the dihydrogen $H_2$ circuit in withdrawal mode of an air recirculation system 10 is described below. The hydrogen $H_2$, coming from the hydride tank 12, under a pressure of 2 to 15 bars, or even 8 to 12 bars, is mixed in M1 with the total recycling of the unconsumed hydrogen $H_{2residuel}$ in the fuel cell 11.

The total hydrogen stream $H_{2total}$ then passes through a heat exchanger 30 to be preheated by the outgoing gases $H_2$ of the fuel cell 11. Then, it is injected into the fuel cell 11 to be oxidised therein and to produce water, electricity and heat.

At the outlet of the fuel cell 11, the hydrogen stream $H_2$ is cooled through the heat exchanger 30 by the incoming gases $H_{2total}$, then it passes through a heat exchanger 31, forming an element for recovering heat at over 400° C., making it possible to recover the heat by exchanging it with a heat transfer fluid FC, such as oil, air, steam, inter cilia.

The hydrogen $H_2$ and steam stream passes through a heat exchanger 33 to be cooled by the hydrogen stream $H_2$ leaving a phase separator 34. After having passed through the heat exchanger 33, the stream $H_2$ passes through a condenser 35, then the phase separator 34 to allow recovery of the water $H_2O$ produced, represented by arrow $F_{H2O}$, and to allow its removal for possible utilization.

At the outlet of the separator 34, the dry hydrogen $H_2$, which may contain some traces of water, is heated by the incoming hydrogen stream $H_2$ passing through the heat exchanger 33, then is sent to a compression pump 36 to compensate for head losses of the circuit, before being mixed in M1 with the hydrogen from the hydride tank 12.

The hydride tank 12 may be any type of tank capable of delivering hydrogen within the desired temperature ranges, on the order of 300 to 400° C., and within the desired pressure ranges, on the order of 2 to some dozen bars. It is necessary, however, for the hydrides to have a hydride absorption temperature sufficient for acting as a steam generator 18 in storage mode and for the cell to release a sufficient amount of heat to allow the desorption of the amount of hydrogen required at its point of operation.

The dihydrogen circuit $H_2$ may also have a purge valve, in order to be capable of removing any neutral gases, such as nitrogen or argon, that may be present in the hydrogen of the storage.

Primary Air Circuit

This circuit is illustrated in FIG. 7. In said FIG. 7, the portions represented by dotted lines refer to the dihydrogen $H_2$ circuit described above in reference to FIG. 6. The primary compressed air circuit is intended to supply the fuel cell 11 with oxygen $O_2$, as well as to remove the heat produced by the cell 11.

The operation of the primary compressed air circuit in withdrawal mode of an air recirculation system 10 is described below. The air leaving the fuel cell 11 passes through a heat exchanger 38 to be cooled by air entering the fuel cell 11.

Then, the air stream passes through a heat exchanger 39, forming an element for recovering heat at over 400° C., itself passed through by a heat transfer fluid FC comprising oil.

The air is then mixed in M1 with an oxygen $O_2$ stream, represented by arrow $F_{O2}$, then cooled through a heat exchanger 40 with the recompressed air, and in a second cooling device 41 to the recompression temperature, then compressed in a compression pump 42. The recompression is only for the value of the head losses and not a complete recompression of 2 to 15 bars which would be done if the air were not recirculated, which represents a substantial gain provided by the invention.

The compressed air is then brought to the temperature at the inlet of the fuel cell 11 by passing through heat exchangers 40 and 38, before being injected into cathode C.

According to the hydrides used, and the desired operating ranges, the heat recovered for desorption may be insufficient. The addition of a hydrogen-powered burner and allowing the heat transfer fluid FC to recover the missing heat may then be envisaged. An additional electrical heating element may also be used, but is less efficient, because the cost of electricity may be high during operation in withdrawal mode, and this will impact the efficiency of the system.

In addition, if there is a need for additional heat to be recovered at the high-temperature heat exchangers 38 and 39 described above, a portion of the hydrogen may be burned in a combustion chamber located upstream of the exchanger considered. This combustion chamber may, for example, be located upstream of the heat exchanger 39 of the primary air circuit, making it possible not to add an exchanger to the heat transfer fluid FC circuit, but makes it necessary to condense the water thus created before recompression. As said recompression is performed under cold, it may present problems of limited design. The combustion chamber may also be located on a burner independent of the hydrogen and air circuits, this assembly being simple to apply but less energetically efficient because the air will have to be preheated with the downside of limiting the part of the combustion energy collected by the heat transfer fluid FC.

Advantageously the air recirculation system makes it possible to produce electricity, potentially decarbonated and/or renewable according to the origin of the electricity in order to produce hydrogen in the storage mode. In addition, it makes it possible to produce high-temperature heat, required for the desorption of the hydrogen in the hydride tank 12, with the possibility of burning a small amount of hydrogen if the fuel cell 11 does not provide enough itself. This eliminates the need for a high-temperature heat source outside the system 10. In addition, it allows for a wide electrical and/or thermal power range around the nominal value, i.e. in this case 75 to 100%. Finally, a slight improvement in efficiency is obtained with respect to a three-stream system, described below, due to the lower compression of air owing to its recirculation associated with an $O_2$ enrichment. In the three-stream system, only a portion of the air is recycled.

Example of an Embodiment

An example will now be described of an embodiment of a SOFC fuel cell 11 thermally coupled with a hydride tank 12 in withdrawal mode with an air recirculation system 10. The different values cited in the following example result from simulations performed using the ProsimPlus software based on thermodynamic models of stack cells as well as auxiliary elements (pumps, converters, etc.).

The objective of the system 10 of this example is to provide electricity with a high efficiency and a wide power range. The storage of hydrides in the hydride tank 12 is performed at a pressure of 10 bars. The range of electricity production powers (AC, injectable in the network) is between 49.5 and 65.3 kW, and between 51.2 and 68.2 kW for the fuel cell 11 (of LHV efficiency varying from 72% for operation at minimum power to 66% for operation at maximum power), and the range of electrical efficiencies obtained for the system is between 59.5 and 60.5% LHV (lower heating value of the hydrogen that has left the tank). An $H_2$ burner is used as a complement for the desorption heat for systems in which the heat collected on the oil loop is not sufficient.

The system 10 therefore comprises a storage of hydrogen by hydrides of the magnesium hydride $MgH_2$ type at a pressure of 10 bars and at 380° C., consuming 75 kJ per mole of $H_2$ released. The high-temperature heat recovered at the exchangers is used to desorb the hydrogen, as well as to overcome the heat losses in the process. The hydride tank 12 requires a supply of desorption energy equal to 75 kJ/(mole of $H_2$ desorbed) and at a temperature above 380° C. When pinching in the high-temperature exchangers is taken into account, only the heat of the process above 400° C. can be recovered for this purpose. Heat losses in the process, on the cell 11 and the tank 12, of 2.7 kW to be compensated, are also taken into account.

If there is a lack of heat recovered at the high-temperature exchangers, a portion of the hydrogen desorbed is burned to supply the additional energy.

The flow rates of the different fluids were set as follows: for hydrogen $H_2$, the flow rate is constant and set at 12 NmL/min/($cm^2$ of cell); and for the primary air, the flow rate is sufficient to limit the temperature increase in the cell 11 to 150° C.

In addition, the cooling strategy is as follows: the temperature of the hydrogen entering the cell 11 is constant and equal to 700° C.; the temperature of the air entering the cell 11 is constant and equal to 600° C.; the temperature at the outlet of the cell is kept constant and equal to 850° C. for the two streams; the primary air flow rate is adjusted to keep the temperature at the outlet of the cell constant, to a maximum flow rate of 48 NmL/min/($cm^2$ of cell).

Figure 8:
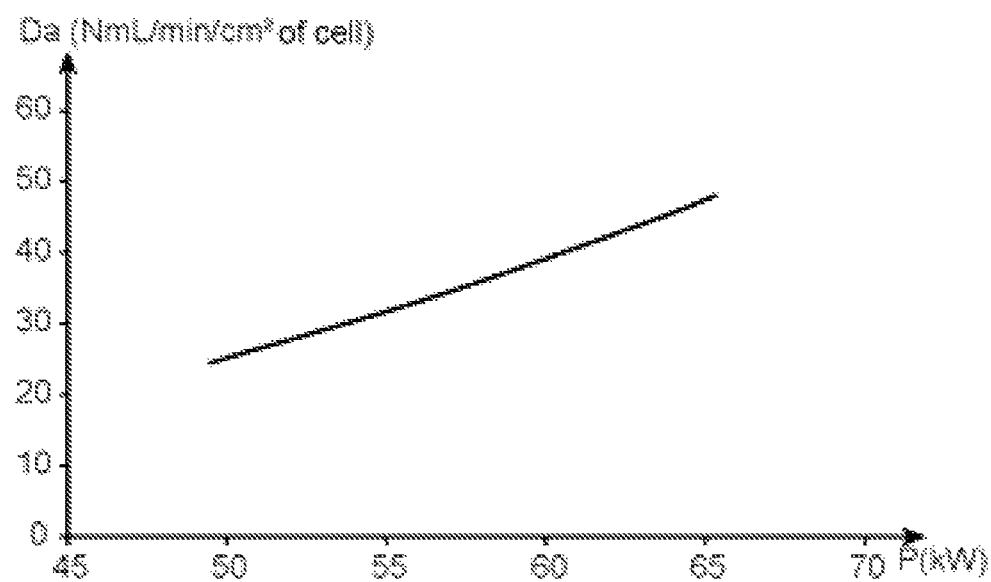
FIG. 8 shows, in a graph, the change in the air flow rate of a system according to the invention as a function of the net electric power of the process corresponding to FIGS. 6 and 7, and a nominal power of 64 kW.
Figure 9:
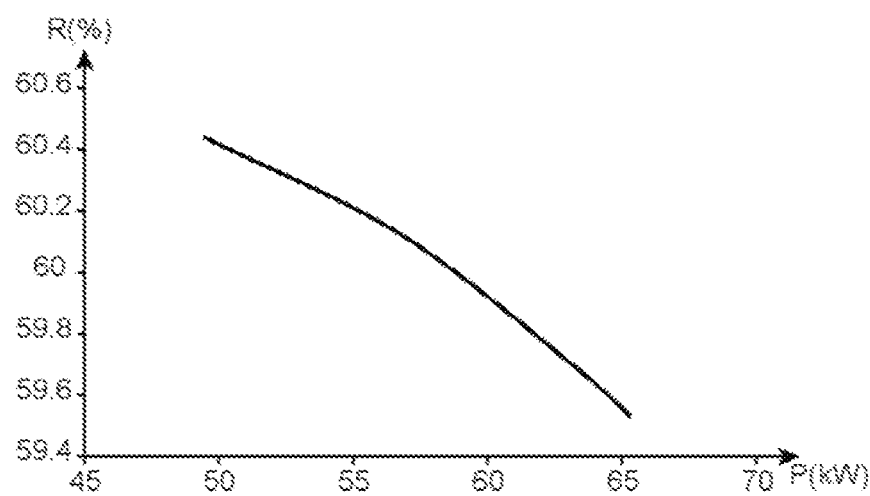
FIG. 9 shows, in a graph, the change in the LHV efficiency of the process of FIG. 8 as a function of the net electric power of the process.
Figure 10:
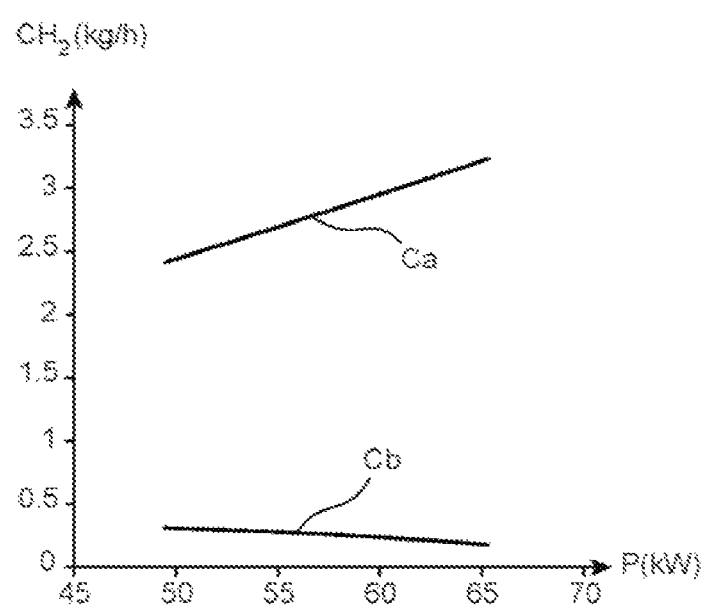
FIG. 10 shows, in a graph, the change in the dihydrogen consumption of the process of FIG. 8 as a function of the net electric power of the process.

The results obtained are represented in a graph in FIG. 8, which shows the change in the air flow rate Da, expressed in NmL/min/($cm^2$ of cell), as a function of the electrical power P of the process, expressed in kW, and also in FIG. 9, which shows the change in the electrical efficiency R of the process in withdrawal mode, expressed as a percentages, as a function of the net power P of the process, expressed in kW, and finally in FIG. 10, which shows the change in the dihydrogen consumption $C_{H2}$, expressed in g/h, as a function of the net power P of the process, expressed in kW. In said FIG. 10, the curve Ca represents the total $H_2$ consumption $H_2$, and the curve Cb represents the consumption of $H_2$ burned to provide additional heat.

The net power P of the process is defined as being the electrical production AC of the cell 11 and of the associated turbine (primary air circuit) from which the consumption of the compressors and recirculators is subtracted.

The efficiency R of the process is defined as follows:

$R$=Net power of the process $P$ in $AC$ injected into the network/[$LHV_{H2}$*Flow rate of $H_2$ consumed]

The net power of the process corresponds to the power produced by the cell, from which the consumption of the auxiliary elements (compressors, cooling units and power electronics) is subtracted.

The system 10 thus makes it possible to operate over a wide power range, while maintaining a high electrical efficiency.

The process is thus capable of utilizing the storage of the hydride tank 12, which has, as a strength, a high hydrogen storage density (on hydride of the $MgH_2$ type, 5% by weight of hydrogen is obtained), without an external heat supply for desorbing the hydrogen, which a conventional system, such as a low-temperature cell system (PEM, etc.) cannot do.

Three-Stream System

Figure 11:
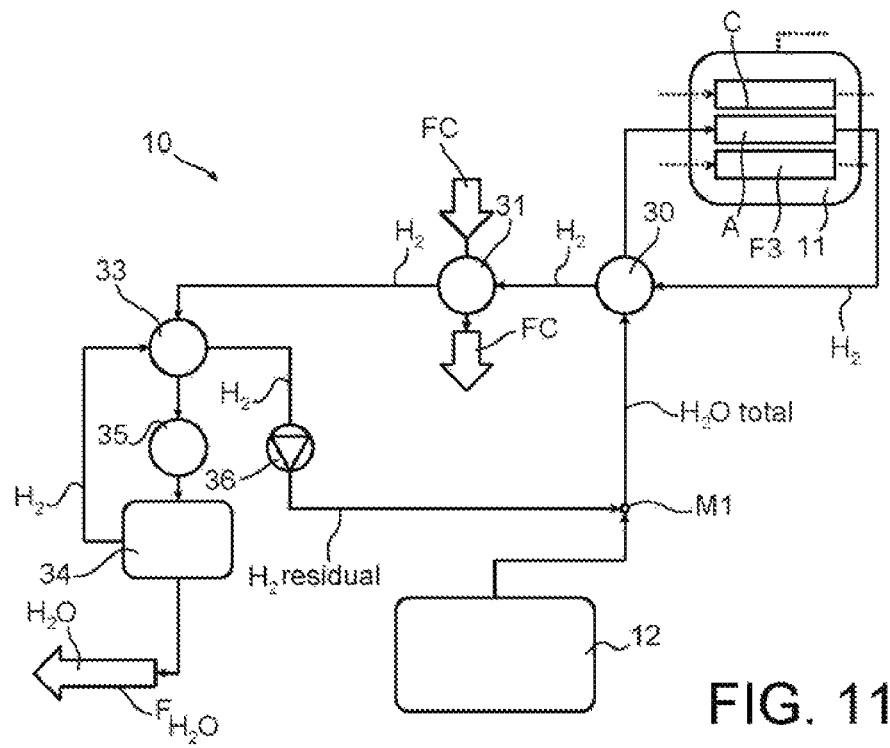
FIG. 11 is a block diagram showing the dihydrogen circuit of an example of a so-called "three-stream" system for high-temperature reversible electrolysis of water according to the invention, comprising a high-temperature reversible electrolyser, operating according to a solid-oxide fuel cell (SOFC) mode.
Figure 12:
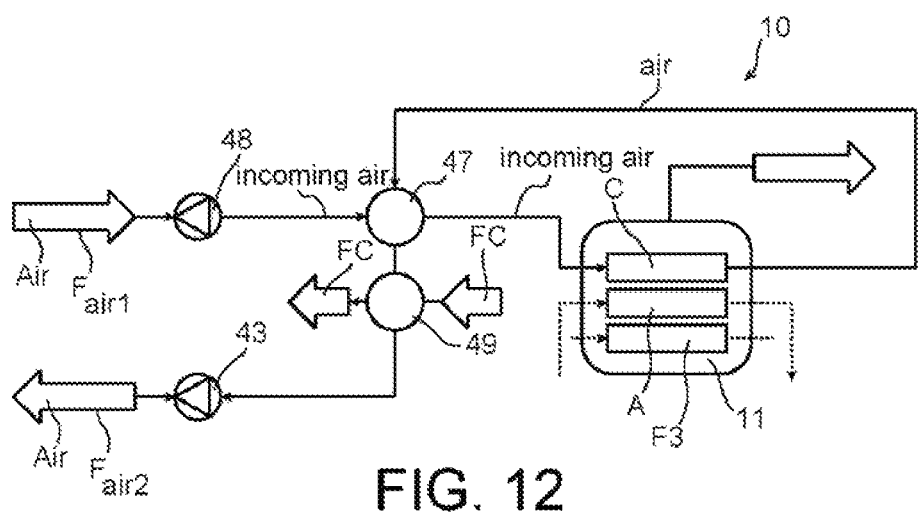
FIG. 12 is a block diagram showing the primary air circuit of the system of FIG. 11.
Figure 13:
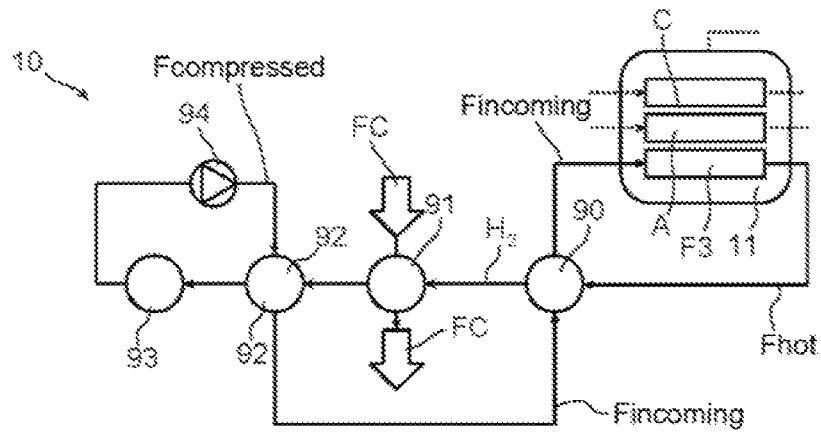
FIG. 13 is a block diagram showing the cooling circuit of the system of FIG. 11.

This system 10 is illustrated in FIGS. 11, 12 and 13. In this case, the SOEC fuel cell 11 of the system 10 according to the invention comprises a three-stream interconnector 5 (allowing the thermal exchange with a cooling fluid distinct from the cathode and anode streams) as described above, the presence of which in the fuel cell 11 is indicated by the reference F3 in FIGS. 11, 12 and 13. In addition, as can be seen in said figures, the fuel cell 11 comprises an anode A and an anode C, as described above. The heat transfer fluids referenced below in the different circuits of FIGS. 11, 12 and 13 are shared to ensure the supply of heat necessary for the desorption of hydrogen from the hydride tank 12.

Below, the operation of a dihydrogen $H_2$ circuit will be described, followed by a description of the operation of the primary air circuit and finally the operation of the cooling circuit which is possible owing to the three-stream interconnector.

Dihydrogen $H_2$ Circuit

This circuit is illustrated in FIG. 11. In said FIG. 11, the portions represented by dotted lines refer to the primary air circuit and the cooling circuit described below in reference to FIGS. 12 and 13. Advantageously, the dihydrogen circuit $H_2$ forms a loop making it possible to recycle the unconsumed hydrogen in the fuel cell 11. Thus, a conversion of close to 100% of the hydrogen is obtained.

The operation of the dihydrogen circuit $H_2$ in withdrawal mode of a three-stream system 10 is advantageously similar in practice to that described above for an air recirculation system 10.

Thus, reference should be made to the description above for the embodiment example of FIG. 6.

Primary Air Circuit

This circuit is illustrated in FIG. 12. In said FIG. 12, the portions represented by dotted lines refer to the dihydrogen $H_2$ circuit and to the cooling circuit described above and below, respectively, in reference to FIGS. 11 and 13. The primary air circuit is intended to supply the fuel cell 11 with oxygen $O_2$.

The operation of the primary air circuit in withdrawal mode of a three-stream system 10 is described below. Ambient air, represented by arrow $F_{air1}$, is compressed in a compression pump 48 to the working pressure, of between 2 and 15 bars, or even between 8 and 12 bars. Then, said air is preheated through a heat exchanger 47 by the gases leaving the fuel cell 11 before being injected into the fuel cell 11 at the level of cathode C.

The depleted and heated air leaves the fuel cell 11, then is cooled by the heat exchanger 47 in which air entering the fuel cell 11 circulates.

Then, the air passes through a heat exchanger 49, forming a heat recovery element, for recovering heat by means of the heat transfer fluid FC.

The air then passes through a turbine 43 in order to recover a maximum of the initial compression work, before being sent back into the atmosphere, represented by arrow $F_{air2}$, after a possible cooling to remove the remaining heat.

The compression pump 48 and the turbine 43 may have a common axis to maximize the recovery of mechanical energy.

In addition, it is possible to provide a burner associated with an $H_2$ tapping located between the heat exchanger 47 and the heat exchanger 49 in order to provide additional heat if the heat supplied by the cell 11 is insufficient for meeting the requirements.

Cooling Circuit

This circuit is illustrated in FIG. 13. In said FIG. 13, the portions represented by dotted lines refer to the dihydrogen $H_2$ circuit and to the primary air circuit described above in reference to FIGS. 11 and 12. The circuit for cooling with a colder gas also serves to cool the cell 11. It operates in a closed circuit to limit the need for compression.

The operation of the cooling circuit in withdrawal mode of a three-stream system 10 is described below. The hot stream $F_{hot}$ leaves the fuel cell 11, then is cooled through a gas/gas heat exchanger 90 by the incoming fluid $F_{incoming}$ entering the fuel cell 11. Then, the stream passes through yet another heat exchanger 91, forming a heat recovery element, responsible for recovering heat by means of a heat transfer fluid FC.

The stream is then completely cooled through another gas/gas heat exchanger 92 by the recompressed fluid $F_{compressed}$ in order to counter the head losses of the circuit, then it passes through yet another device 93, for supercooling, before being compressed by the compression pump 94.

Then, the compressed gaseous fluid is preheated by the stream leaving the cell 11 at the heat exchangers 92 and 90 before being injected into the fuel cell 11.

It should be noted that the fluid used as a third channel F3 can be any non-condensable gas within the temperature and pressure ranges of the process considered. It must also be non-corrosive to the various materials of the process with which it comes into contact. Air may preferably be chosen to satisfy these conditions, as it has the advantage of not requiring any particular storage.

It is also noted that the third channel F3 may represent a heat exchanger integrated in the stack, similarly to that of the patent application GB 2 151 840 A, or the enclosure containing the stacks if stacks optimized for exchange with the enclosure by convective exchange are used, similarly to that described in patent application US 2006/105213 A1 or by radiative exchange, similarly to that described in the international application WO 2013/060869 A1.

The system 10 may also comprise a fluid tank, when it does not correspond to air, a compressor making it possible to add fluid at the correct pressure to the loop if the flow rate required by the system 10 increases, and a purge valve for purging to the fluid tank, making it possible to reduce the cooling fluid flow rate in the loop.

The system 10 may also, when the heat transfer fluid is air, comprise a compressor making it possible to add air at the correct pressure to the loop if the flow rate of the heat transfer fluid required by the system 10 increases, and a purge valve for purging to the atmosphere, making it possible to reduce the cooling air flow rate in the loop.

In addition, if there is a need for additional heat to be recovered at the high-temperature heat exchangers 31, 49 and 91, a portion of the hydrogen from the hydride tank 12 may be mixed with air of the primary cycle as a combustion agent to be burned in a combustion chamber located upstream of the exchanger considered.

Advantageously, the three-stream system makes it possible to produce electricity, potentially decarbonated and/or renewable depending on the origin of the electricity used to produce the hydrogen. In addition, it makes it possible to produce heat, required for the desorption of the hydrogen in the hydride tank 12, with the possibility of burning a small amount of hydrogen if the fuel cell 11 does not provide enough itself. This eliminates the need for a high-temperature heat source outside the system 10. In addition, it allows for a wide electrical and/or thermal power range around the nominal value (45-105% in the example described here).

Finally, although a lower efficiency is obtained than in an air recirculation system, as described above, due to the compression of the cathode air, which thus increases the consumption of the compressors, this solution does not require a storage of oxygen. It also allows for a better maximum current density due to the higher maximum air flow rate (cathode air and heat transfer fluid), which ensures better cooling of the system.

Example of an Embodiment

An embodiment will now be described of a SOFC fuel cell 11 thermally coupled to a hydride tank 12 in withdrawal mode with a three-stream system 10. The different values cited in the following example result from simulations performed using the ProsimPlus software on the basis of thermodynamic models of stack cells as well as auxiliary elements (pumps, converters, etc.). The objective of the system 10 of this example is to provide electricity with a higher efficiency and a wide power range. The storage of hydrides in the hydride tank 12 is performed at a pressure of 10 bars. The range of electricity production powers is between 28 and 68 kW AC injectable in the network, and between 33.5 and 77.6 kW for the fuel cell 11 (of LHV efficiency varying from 83% for operation at minimum power to 63% for operation at maximum power), and the range of efficiencies obtained is between 50 and 54% LHV (lower heating value of the hydrogen introduced). An $H_2$ burner is used as a complement for the desorption heat. The cooling fluid chosen is air.

The system 10 therefore comprises a storage of hydrogen by hydrides of the magnesium hydride $MgH_2$ type at a pressure of 10 bars and at 380° C., consuming 75 kJ per mole of $H_2$ released. The heat recovered at the exchangers is used to desorb the hydrogen, as well as to overcome the heat losses of the process. The hydride tank 12 requires a supply of desorption energy equal to 75 kJ/(mole of $H_2$ desorbed) and at a temperature above 380° C. When pinching in the high-temperature exchangers is taken into account, only the heat of the process above 400° C. can be recovered for this purpose. Heat losses in the process, on the cell 11 and the tank 12, of 2.7 kW to be compensated, are also taken into account.

If there is a lack of heat recovered at the exchangers, a portion of the hydrogen desorbed is burned upstream of the heat exchanger forming a heat recovery element of the primary air circuit.

The flow rates of the different fluids were set as follows: for hydrogen $H_2$, the flow rate is constant and set at 12 NmL/min/(cm² of cell); and for the primary air, the maximum flow rate is 17 NmL/min/(cm² of cell); and for the cooling air, the flow rate is between 0 and 48 NmL/min/(cm² of cell).

In addition, the cooling strategy is as follows: the temperature of the hydrogen entering the cell 11 is constant and equal to 700° C.; the temperature of the primary and cooling air entering the cell 11 is constant and equal to 600° C.; the temperature at the outlet of the cell is kept constant and equal to 850° C.; at low power, the cooling air flow rate is cut, and the primary air flow rate is adjusted to obtain the correct temperature at the outlet of the cell; when the power increases, the primary air flow rate is increased to reach 17 NmL/min/(cm² of cell), and the primary air flow rate is then increased to a maximum flow rate of 48 NmL/min/(cm² of cell).

Figure 14:
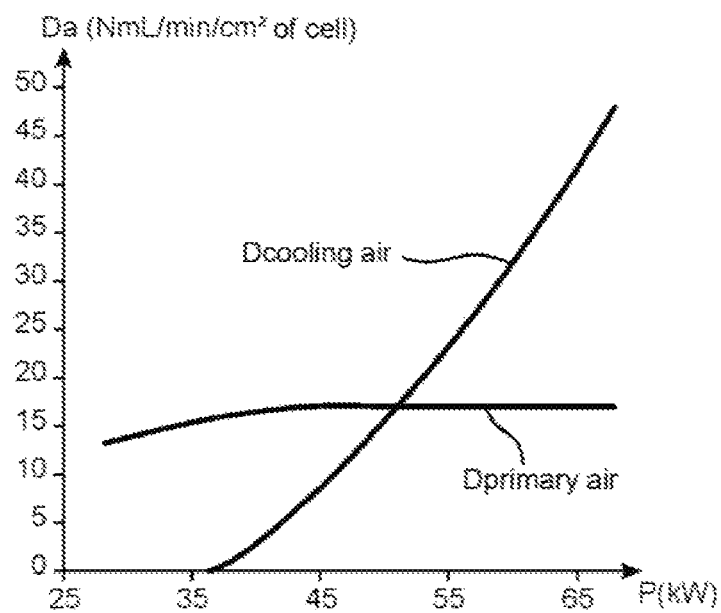
FIG. 14 shows, in a graph, the change in the primary air flow rate and cooling air flow rate of a system according to the invention as a function of the net electric power of the corresponding process.
Figure 15:
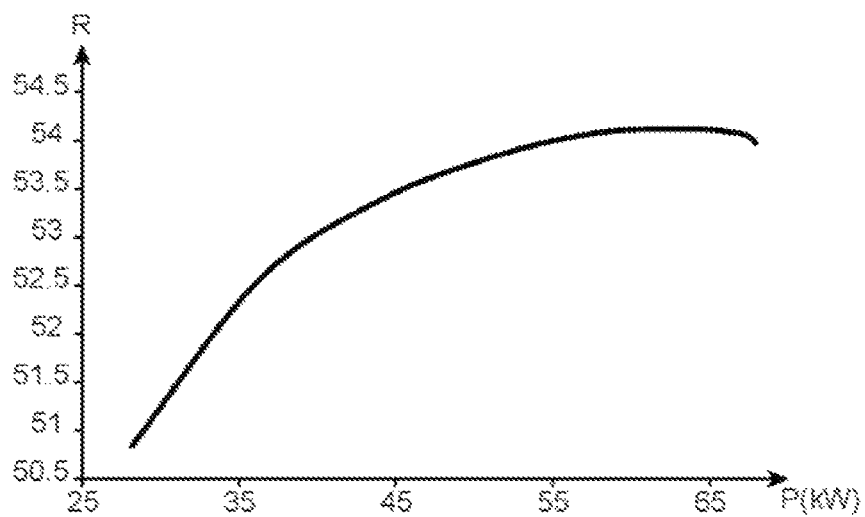
FIG. 15 shows, in a graph, the change in the LHV efficiency of the process of FIG. 14 as a function of the net electric power of the process (AC)
Figure 16:
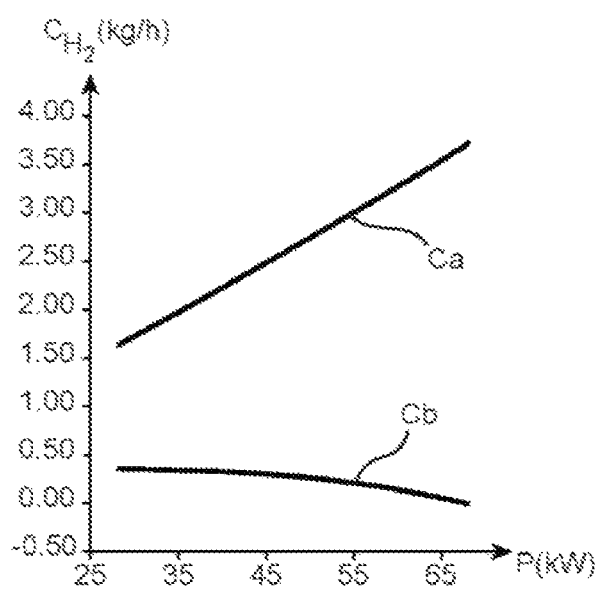
FIG. 16 shows, in a graph, the change in the dihydrogen consumption as a function of the net electric power of the process of FIG. 14.

The results obtained are presented in a graph in FIG. 14, which shows the change in primary air $D_{primary\ air}$ and cooling air $D_{cooling\ air}$ flow rates, expressed in NmL/min/ (cm² of cell), as a function of the net electric power (AC) P of the process, expressed in kW, and also in FIG. 15, which shows the change in the electrical efficiency R of the process, expressed as percentages, as a function of said net power (AC) P of the process, expressed in kW, and finally in FIG. 16, which shows the change in dihydrogen consumption $C_{H2}$, expressed in kg/h, as a function of the net power P of the process, expressed in kW. In said FIG. 16, the curve Ca represents the total $H_2$ consumption, and the curve Cb represents the consumption of $H_2$ burned to provide additional heat.

The net power P of the process is defined as being the electrical production of the cell 11 and the associated turbine (primary air circuit) from which the consumption of the compressors and recirculators is subtracted. The total is accounted for at the outlet of the system, therefore in AC power.

The electrical efficiency R of the process is defined as follows:

$R$=Net electrical power of the process
$P/[LHV_{H2}*$Flow rate of $H_2$ consumed]

The net power of the process corresponds to the production of the cell and of the turbine, from which the consumptions of the system are subtracted, namely those of the compressors, the cold utilities and the power electronics.

The system 10 proposes an expanded power range because, by taking the optimum efficiency as nominal (54.12% at 63.9 kW net electrical power), a utilizable power range of 44 to 106% of the nominal is obtained.

The process is thus capable of utilizing the storage of the hydride tank 12, which has, as a strength, a high hydrogen storage density (on hydride of the $MgH_2$ type, 5% by weight of hydrogen is obtained), without an external heat supply for desorbing the hydrogen, which a more conventional system, such as a low-temperature cell system (PEM, etc.) cannot do.

It should be noted that for the air recirculation and three-stream systems described above, the $H_2$ utilization rate (fraction of the incoming hydrogen consumed by the cell 11) is preferably below 80% so as to limit the degradation of the cells of the stack 11. In addition, the air flow rate is preferably chosen so that the oxygen $O_2$ content at the outlet of the fuel cell 11 is at least 10%. If significant cooling is needed, the air flow rate may be increased, to a maximum of around 48 NmL/min/(cm² of cell) on average.

In addition, for both air recirculation and three-stream systems, the management of the system 10 in order to respond to fluctuating electrical power needs regarding the choice of the dihydrogen $H_2$ flow rate can take place in three main ways on the hydrogen $H_2$ circuit, namely:

a constant utilization rate: the hydrogen flow rate is adjusted so that the fraction of hydrogen consumed remains constant. This configuration is limited by the maximum flow rate of the different gases (hydrogen, air and cooling fluid) accepted by each channel of the fuel cell;

constant hydrogen $H_2$ flow rate: the flow rate of hydrogen entering the fuel cell is kept constant, which has the effect of increasing the utilization rate with the increase in power. This configuration is limited by the maximum utilization rate admissible by the cell in order to limit degradation;

variable hydrogen flow rate $H_2$ and power: the system modifies both the hydrogen flow rate entering the cell and the fraction of hydrogen consumed. This configuration requires an advanced command and control, in particular concerning the management of the air and cooling fluid streams, but offers a wider power response range than the two modes presented above.

The choice of the primary air flow rate depends directly upon the system used. It is preferably maintained so as to keep the temperature increase relatively constant, and below 150° C. The air flow rate must also ensure the supply of oxygen, and continue to be provided so as not to go below 10% oxygen at the outlet of the fuel cell.

The choice of the cooling fluid flow rate for a three-stream system is adjusted so as to maintain the temperature increase in the fuel cell below the maximum heating.

In addition, in the examples described above concerning the withdrawal mode, the addition of heat necessary for desorbing the hydrogen, which cannot be provided by simple recovery, is ensured by burning a portion of the hydrogen. It is also possible to envisage a supply by electrical heating, even if the electricity may have a high cost during an operation in withdrawal mode, and this will impact the efficiency of the system.

In addition, the system 10 may operate in a downgraded mode. In particular, in storage mode, the hydrogen produced may be used for other purposes than for storage in the hydride tank 12. This, however, requires a heat source to vaporize the water and to compensate for the lack of heat supplied by the tank, which does not absorb the hydrogen produced. It may be an electrical source, significantly reducing the efficiency of the system, or an exterior source, supplied, for example by an appended process. In withdrawal mode, if the hydride tank 12 is exhausted, it is possible to use another source of hydrogen, for example, by liquid or pressure storage. Then there is an excess of heat that must be removed. It can be discharged from the system, for example by injection on an urban heating network, by use by a third-party system, inter alio, or be removed by the process, in which case there is a need for an additional cooling system, for example an air cooler.

In addition, in the three-stream system presented above, the air of the cathode operates in an open cycle in order to provide the oxygen necessary for the reaction. An operation with air recycling, similar to that described for the air recirculation system, may, however, be envisaged. This would make it possible to reduce the work of compressing the air on the cathode side, and would thus slightly increase the efficiency. This would also make it possible to work at a higher current density than that obtained in the two systems envisaged, as the cooling fluid flow rate then becomes double the 48 NmL/min/(cm$^2$ of cell). However, this would require a storage of oxygen to supplement that consumed by the reaction at the cathode.

If the electrical efficiency of the storage of the facility is considered, represented by a complete storage cycle (optimal efficiency of the conversion of electricity to hydrogen absorbed (LHV) of 87%), followed by a complete withdrawal cycle (optimal efficiency of conversion of absorbed hydrogen into electricity of 54% in the case of three-stream systems, and 60% in the case of an air recirculation system), which corresponds to the efficiency of the facility used for the energy storage, electricity storage efficiencies of 47% (three-stream systems) and 52% (air recirculation system) are obtained. This is higher than the efficiency that can be expected from a low-temperature storage chain (comprised of an electrolyser of the PEM or alkaline type, and a PEM cell), which has a system efficiency of around 20%.

Of course, the invention is not limited to the embodiment examples described above. Various modifications may be made by a person skilled in the art.

The invention can be applied in numerous industrial technical fields, and primarily in the storage of electrical energy in the form of hydrogen. The dimensioning of the system 10, and in particular of the electrolyser 11 and the hydride tank 12, is then chosen according to the power delivery requirements and electricity resources available.

The system 10 may advantageously be coupled with renewable energy, for example of the photovoltaic and/or wind turbine type, in order to guarantee the production of electricity. In such a case, a network injection profile may be provided, producing electricity when the initial source of renewable energy production is too low, for example at night for the photovoltaic power, and storing it in the form of hydrogen when there is an excess in production.

It is possible to design a system 10 dedicated to the production of hydrogen absorbed on hydrides, with replacement of the tank 12 when it is full, but all the same having this possibility for producing electricity when, for example, the price of electricity on a conventional market is high.

In addition, the storage and withdrawal modes described above may be used independently and for different applications. For example, the hydrogen stored on hydrides constitutes a hydrogen transport mode. It is therefore possible via this process to supply hydrogen consumers by means of an integrated and efficient production process, and the withdrawal of hydrogen at a client site can then benefit from external heat supplies, such as waste heat.

What is claimed is:

1. A system for high-temperature reversible electrolysis of water, comprising:
a high-temperature reversible electrolyser, configured to operate in a solid-oxide electrolyser mode, for the production of hydrogen and thus the storage of electricity, and/or according to a solid-oxide fuel cell mode, for the consumption of hydrogen and thus the withdrawal of electricity, said reversible electrolyser comprising an enclosure and a stack of basic solid-oxide electrochemical cells contained within the enclosure, wherein the enclosure is configured to enable the reversible electrolyser to operate under a pressure of between 2 and 15 bars,
a hydride tank, thermally coupled with said reversible electrolyser, configured to store hydrogen in the form of hydrides in solid-oxide electrolyser mode of said reversible electrolyser and/or to release hydrogen in solid-oxide fuel cell mode of said reversible electrolyser,
a primary air circuit comprising:
a first heat exchanger,
a heat recovery element comprising a second heat exchanger, and
a third heat exchanger, intended to: (1) cool a total stream mixed by a mixer suitable for mixing an air stream by means of a compressed air stream; and (2) preheat the compressed air stream by means of the total stream mixed by the mixer suitable for mixing the air stream to form an air stream entering the reversible electrolyser, and
a cooling device configured to cool an air stream leaving the third heat exchanger when the system is configured to operate in solid-oxide fuel cell mode and is a compressed air recirculation system,
the system being configured to allow, when the reversible electrolyser is configured to operate in a solid-oxide electrolyser mode, a recovery of heat released by the hydride tank during the absorption of hydrogen in order to produce pressurized steam intended to enter the reversible electrolyser, and to allow, when the reversible electrolyser is configured to operate in a solid-oxide fuel cell mode, a recovery of heat released by at least one stream leaving the reversible electrolyser to enable the desorption of hydrogen from the hydride tank.

2. The system according to claim 1, wherein each basic solid-oxide electrochemical cell in the stack is formed by a cathode, an anode, and an electrolyte inserted between the cathode and the anode, and a plurality of electrical and fluidic interconnectors each arranged between two adjacent basic solid-oxide electrochemical cells.

3. The system according to claim 1, wherein the reversible electrolyser is configured to operate in a solid-oxide electrolyser mode, and the system then comprises:
- a steam generator, intended to produce the pressurized steam for the reversible electrolyser by means of the heat released by the hydride tank, during absorption of the hydrogen, and supplied to the steam generator by means of a heat transfer fluid.

4. The system according to claim 3, wherein the system also comprises:
- one or more solid-oxide electrolyser mode heat exchangers allowing water at an inlet of the system to be preheated and/or the pressurized steam entering the reversible electrolyser to be superheated, by means of hydrogen and oxygen streams leaving the reversible electrolyser.

5. The system according to claim 4, wherein the system comprises one or more solid-oxide electrolyser mode heat exchangers upstream and downstream of the steam generator for allowing the water at the inlet of the system to be preheated and the pressurized steam entering the reversible electrolyser to be superheated, respectively, by means of the hydrogen and oxygen streams leaving the reversible electrolyser.

6. The system according to claim 3, wherein the system also comprises:
- a condenser, coupled to a phase separator, intended to receive unreacted steam in the reversible electrolyser and dihydrogen produced by the reversible electrolyser and to condense unreacted water so that it can be recycled in the system.

7. The system according to claim 3, wherein the system also comprises:
- a compression pump, intended to compress water at an inlet of the system to a pressure of between 2 and 15 bars.

8. The system according to claim 3, wherein the system also comprises:
- an electrical heating element upstream of the reversible electrolyser, providing an additional superheating of the pressurized steam.

9. The system according claim 6, wherein the system also comprises:
- a dryer, upstream of the hydride tank and downstream of the phase separator, intended to allow the humidity contained in the dihydrogen to be removed before storage in the hydride tank.

10. The system according to claim 1, wherein the reversible electrolyser is configured to operate in a solid-oxide fuel cell mode, and wherein the system is a compressed air recirculation system, consisting of a dihydrogen circuit and the primary air circuit.

11. The system according to claim 10, wherein the dihydrogen circuit comprises:
- a mixer suitable for mixing the hydrogen coming from the hydride tank with unconsumed hydrogen in the reversible electrolyser over a pressure range of 2 to 15 bars,
- a first dihydrogen circuit heat exchanger, intended to preheat a dihydrogen stream entering the reversible electrolyser by means of a dihydrogen stream leaving the reversible electrolyser,
- a heat recovery element comprising a second dihydrogen circuit heat exchanger, intended to recover heat from the dihydrogen stream leaving the reversible electrolyser by means of at least one heat transfer fluid.

12. The system according to claim 11, wherein the dihydrogen circuit further comprises a third dihydrogen circuit heat exchanger, intended to cool the dihydrogen stream leaving the heat recovery element comprising the second dihydrogen heat exchanger by a hydrogen stream leaving a phase separator, allowing for recovery of water produced.

13. The system according to claim 1, wherein:
- the first heat exchanger of the primary air circuit is configured to preheat an air stream entering the reversible electrolyser by means of an air stream leaving the reversible electrolyser,
- the heat recovery element comprising the second heat exchanger of the primary air circuit is configured to recover heat coming from the air stream leaving the reversible electrolyser by means of at least one heat transfer fluid.

14. The system according to claim 1, wherein the mixer is suitable for mixing the air stream leaving the heat recovery element comprising the second heat exchanger with supplemental oxygen forming a total stream of air entering the reversible electrolyser.

15. The system according to claim 1, wherein the primary air circuit further comprises
- a compression pump, configured to compress air leaving the cooling device to form the compressed air stream.

16. A process for storing electricity and/or for withdrawing electricity by high-temperature reversible electrolysis of water, wherein the process is implemented by means of a system for high-temperature reversible electrolysis of water according to claim 1, and wherein the process comprises the steps of:
- when the pressurized reversible electrolyser is configured to operate in a solid-oxide electrolyser mode, recovering the heat released by the hydride tank during absorption of the hydrogen in order to produce pressurized steam intended to enter the reversible electrolyser, and
- when the pressurized reversible electrolyser is configured to operate in a solid-oxide fuel cell mode, recovering the heat released by the at least one stream leaving the reversible electrolyser in order to allow the desorption of the hydrogen from the hydride tank.

17. The process according to claim 16, wherein the process is implemented according to an electricity storage mode, the high-temperature reversible electrolyser being configured to operate in a solid-oxide electrolyser mode, and the process comprising the step of carrying out the high-temperature electrolysis reaction of the steam in order to produce hydrogen and thus store electricity.

18. The process according to claim 17, wherein the process is implemented by means of a system for high-temperature reversible electrolysis of water and wherein the process comprises the following series of steps:
- introducing a total water of the system, comprising injection water and recycled water from a phase separator, into a compression pump to a pressure of between 2 and 15 bars,
- circulating the total water of the system through solid-oxide electrolyser mode heat exchangers to allow for preheating of water at the inlet of the system by means of hydrogen and oxygen streams leaving the reversible electrolyser,
- introducing the water at the inlet of the system into a steam generator, to produce pressurized steam intended for the reversible electrolyser by means of the heat released by the hydride tank, during absorption of the hydrogen, and supplied to the steam generator by a heat transfer fluid,
- circulating the pressurized steam through solid-oxide electrolyser mode heat exchangers to allow for superheating of the pressurized steam before it enters the reversible electrolyser, by means of the hydrogen and oxygen streams leaving the reversible electrolyser, additional superheating of the pressurized steam to reach a working temperature of the electrolyser by using an electrical heating element, introducing the pressurized steam into the reversible electrolyser in order to produce the hydrogen and oxygen streams, cooling the hydrogen and oxygen streams by means of solid-oxide electrolyser mode heat exchangers, condensing unreacted pressurized steam in the phase separator to produce the recycled water reintroduced into the system, storing hydrogen produced, dried, in the hydride tank.

19. The process according to claim 16, wherein the process is implemented according to an electricity withdrawal mode, the high-temperature reversible electrolyser being configured to operate according to a solid-oxide fuel cell, and the process comprising the step of producing an inverse reaction of high-temperature electrolysis of the pressurized steam in order to withdraw the hydrogen and thus produce electricity.

20. The process according to claim 19, wherein the process is implemented by means of a system for high-temperature reverse electrolysis of water wherein the reversible electrolyser is configured to operate in a solid-oxide fuel cell mode, wherein the system is a compressed air recirculation system consisting of a dihydrogen circuit and the primary air circuit, and wherein the dihydrogen circuit comprises:

means for mixing the hydrogen coming from the hydride tank with a total recycling of unconsumed hydrogen in the reversible electrolyser over a pressure range of 2 to 15 bars, a first dihydrogen air circuit heat exchanger, intended to preheat a dihydrogen stream entering the reversible electrolyser by means of a dihydrogen stream leaving the reversible electrolyser, a heat recovery element comprising a second dihydrogen circuit heat exchanger intended to recover heat from the dihydrogen stream leaving the reversible electrolyser by means of at least one heat transfer fluid, and wherein the process comprises the following series of steps:

for the dihydrogen circuit:

mixing the hydrogen coming from the hydride tank with the total recycling of the unconsumed hydrogen in the reversible electrolyser by way of mixing means to produce total hydrogen, injecting the total hydrogen through the first dihydrogen air circuit heat exchanger allowing it to be preheated by the hydrogen stream leaving the reversible electrolyser, injecting the total hydrogen into the reversible electrolyser for consumption thereof and production of water, electricity and heat, cooling the hydrogen stream leaving the reversible electrolyser by the first heat exchanger, cooling the hydrogen stream leaving the first dihydrogen air circuit heat exchanger by the heat recovery element comprising the second dihydrogen air circuit heat exchanger configured to recover heat by exchanging the heat with a heat transfer fluid, separating the hydrogen stream from a water stream produced, coming from a phase separator, recycling the unconsumed hydrogen by recompressing the unconsumed hydrogen only for a value of the head losses, for the primary air circuit:

injecting air leaving the reversible electrolyser through the first heat exchanger of the primary air circuit in order to be cooled by compressed air entering the reversible electrolyser, injecting air leaving the first heat exchanger through the heat recovery element comprising the second heat exchanger of the primary air circuit through which a heat transfer fluid passes, mixing air leaving the heat recovery element comprising the second heat exchanger of the primary air circuit with supplemental oxygen in the mixer to form the total stream, injecting said total stream into the third heat exchanger of the primary air circuit, then the cooling device, then a compression pump in order to compensate for head losses to obtain the compressed air stream injected into said third heat exchanger of the primary air circuit downstream of the mixer, injecting the air stream entering the reversible electrolyser into the first heat exchanger of the primary air circuit to be preheated and then into the reversible electrolyser at the targeted pressure of 2 to 15 bars.

21. A system for high-temperature reversible electrolysis of water, comprising:

a high-temperature reversible electrolyser, configured to operate in a solid-oxide electrolyser mode, for the production of hydrogen and thus the storage of electricity, and/or according to a solid-oxide fuel cell mode, for the consumption of hydrogen and thus the withdrawal of electricity, said reversible electrolyser comprising an enclosure and a stack of basic solid-oxide electrochemical cells contained within the enclosure, wherein the enclosure is configured to enable the reversible electrolyser to operate under a pressure of between 2 and 15 bars, a hydride tank, thermally coupled with said reversible electrolyser, configured to store hydrogen in the form of hydrides in solid-oxide electrolyser mode of said reversible electrolyser and/or to release hydrogen in solid-oxide fuel cell mode of said reversible electrolyser, a cooling circuit comprising:

a first heat exchanger, a heat recovery element comprising a second heat exchanger, a third heat exchanger, intended to: (1) cool a hot stream leaving the second heat exchanger by means of a compressed fluid stream; and (2) preheat the compressed fluid stream by means of the hot stream leaving the second heat exchanger to form an air stream entering the reversible electrolyser; and a cooling device, intended to cool a stream leaving the third heat exchanger, when the system is configured to operate in solid-oxide fuel cell mode and is a compressed air recirculation system;

the system being configured to allow, when the reversible electrolyser is configured to operate in a solid-oxide electrolyser mode, a recovery of heat released by the hydride tank during the absorption of hydrogen in order to produce pressurized steam intended to enter the reversible electrolyser, and to allow, when the reversible electrolyser is configured to operate in a solid-oxide fuel cell mode, a recovery of heat released by at least one stream leaving the reversible electrolyser to enable the desorption of hydrogen from the hydride tank.

22. The system according to claim 21, wherein each basic solid-oxide electrochemical cell in the stack is formed by a cathode, an anode, and an electrolyte inserted between the cathode and the anode, and a plurality of electrical and fluidic interconnectors each arranged between two adjacent basic solid-oxide electrochemical cells.

23. The system according to claim 21, wherein the reversible electrolyser is configured to operate in a solid-oxide electrolyser mode, and the system then comprises:
a steam generator, intended to produce the pressurized steam for the reversible electrolyser by means of the heat released by the hydride tank, during absorption of the hydrogen, and supplied to the steam generator by means of a heat transfer fluid.

24. The system according to claim 23, wherein the system also comprises:
one or more solid-oxide electrolyser mode heat exchangers allowing water at an inlet of the system to be preheated and/or the pressurized steam entering the reversible electrolyser to be superheated, by means of hydrogen and oxygen streams leaving the reversible electrolyser.

25. The system according to claim 24, wherein the system comprises one or more solid-oxide electrolyser mode heat exchangers upstream and downstream of the steam generator for allowing the water at the inlet of the system to be preheated and the pressurized steam entering the reversible electrolyser to be superheated, respectively, by means of the hydrogen and oxygen streams leaving the reversible electrolyser.

26. The system according to claim 23, wherein the system also comprises:
a condenser, coupled to a phase separator, intended to receive unreacted steam in the reversible electrolyser and dihydrogen produced by the reversible electrolyser and to condense unreacted water so that it can be recycled in the system.

27. The system according to claim 23, wherein the system also comprises:
a compression pump, intended to compress water at an inlet of the system to a pressure of between 2 and 15 bars.

28. The system according to claim 23, wherein the system also comprises:
an electrical heating element upstream of the reversible electrolyser, providing an additional superheating of the pressurized steam.

29. The system according claim 26, wherein the system also comprises:
a dryer, upstream of the hydride tank and downstream of the phase separator, intended to allow the humidity contained in the dihydrogen to be removed before storage in the hydride tank.

30. The system according to claim 21, wherein the reversible electrolyser is configured to operate in a solid-oxide fuel cell mode, and wherein the system is a three-stream system, consisting of a dihydrogen circuit, a primary air circuit and the cooling circuit using a three-stream interconnector.

31. The system according to claim 30, wherein the primary air circuit comprises:
a first primary air circuit heat exchanger, intended to preheat an air stream entering the reversible electrolyser by means of an air stream leaving the reversible electrolyser,
a heat recovery element comprising a second primary air circuit heat exchanger, intended to recover heat coming from the air stream leaving the reversible electrolyser by means of at least one heat transfer fluid.

32. The system according to claim 21, wherein:
the first heat exchanger of the cooling circuit is configured to preheat a stream entering the reversible electrolyser by means of a hot stream leaving the reversible electrolyser,
the heat recovery element comprising the second heat exchanger of the cooling circuit is configured to recover heat coming from the hot stream leaving the reversible electrolyser by means of at least one heat transfer fluid,
and wherein the cooling circuit further comprises a compression pump, intended to compress a stream leaving the cooling device, to form the compressed fluid stream.

33. A process for storing electricity and/or for withdrawing electricity by high-temperature reversible electrolysis of water, wherein the process is implemented by means of a system for high-temperature reversible electrolysis of water according to claim 21, and wherein the process comprises the steps of:
when the pressurized reversible electrolyser is configured to operate in a solid-oxide electrolyser mode, recovering the heat released by the hydride tank during absorption of the hydrogen in order to produce pressurized steam intended to enter the reversible electrolyser, and
when the pressurized reversible electrolyser is configured to operate in a solid-oxide fuel cell mode, recovering the heat released by the at least one stream leaving the reversible electrolyser in order to allow the desorption of the hydrogen from the hydride tank.

34. The process according to claim 33, wherein the process is implemented according to an electricity storage mode, the high-temperature reversible electrolyser being configured to operate in a solid-oxide electrolyser mode, and the process comprising the step of carrying out the high-temperature electrolysis reaction of the steam in order to produce hydrogen and thus store electricity.

35. The process according to claim 17, wherein the process is implemented by means of a system for high-temperature reversible electrolysis of water and wherein the process comprises the following series of steps:
introducing a total water of the system, comprising injection water and recycled water from a phase separator, into a compression pump to a pressure of between 2 and 15 bars,
circulating the total water of the system through solid-oxide electrolyser mode heat exchangers to allow for preheating of water at the inlet of the system by means of hydrogen and oxygen streams leaving the reversible electrolyser,
introducing the water at the inlet of the system into a steam generator, to produce pressurized steam intended for the reversible electrolyser by means of the heat released by the hydride tank, during absorption of the hydrogen, and supplied to the steam generator by a heat transfer fluid,
circulating the pressurized steam through solid-oxide electrolyser mode heat exchangers to allow for superheating of the pressurized steam before it enters the reversible electrolyser, by means of the hydrogen and oxygen streams leaving the reversible electrolyser,
additional superheating of the pressurized steam to reach a working temperature of the electrolyser by using an electrical heating element, introducing the pressurized steam into the reversible electrolyser in order to produce the hydrogen and oxygen streams, cooling the hydrogen and oxygen streams by means of solid-oxide electrolyser mode heat exchangers, condensing unreacted pressurized steam in the phase separator to produce the recycled water reintroduced into the system, storing hydrogen produced, dried, in the hydride tank.

36. The process according to claim 33, wherein the process is implemented according to an electricity withdrawal mode, the high-temperature reversible electrolyser being configured to operate according to a solid-oxide fuel cell, and the process comprising the step of producing an inverse reaction of high-temperature electrolysis of the pressurized steam in order to withdraw the hydrogen and thus produce electricity.

37. The process according to claim 36, wherein the process is implemented by means of a three-stream system for high-temperature pressurized reversible electrolysis of water, wherein the system is a three-stream system, consisting of a dihydrogen circuit, a primary air circuit and the cooling circuit using a three-stream interconnector, and wherein the dihydrogen circuit comprises:

means for mixing the hydrogen coming from the hydride tank with a total recycling of unconsumed hydrogen in the reversible electrolyser over a pressure range of 2 to 15 bars, a first dihydrogen circuit heat exchanger, intended to preheat a dihydrogen stream entering the reversible electrolyser by means of a dihydrogen stream leaving the reversible electrolyser, a heat recovery element comprising a second dihydrogen circuit heat exchanger intended to recover heat from the dihydrogen stream leaving the reversible electrolyser by means of at least one heat transfer fluid, and wherein the process comprises the following series of steps:

for the dihydrogen circuit:

mixing the hydrogen coming from the hydride tank at the targeted pressure of 2 to 15 bars, with the total recycling of unconsumed hydrogen in the reversible electrolyser by way of mixing means to produce total hydrogen, injecting the total hydrogen at the targeted pressure of 2 to 15 bars through the first dihydrogen circuit heat exchanger allowing it to be preheated by the hydrogen stream leaving the reversible electrolyser, injecting the total hydrogen at the targeted pressure of 2 to 15 bars into the reversible electrolyser for consumption thereof and production of water, electricity and heat, cooling the hydrogen stream leaving the reversible electrolyser by the first dihydrogen circuit heat exchanger, cooling the hydrogen stream leaving the first dihydrogen circuit heat exchanger by the heat recovery element comprising the second dihydrogen circuit heat exchanger, allowing the heat to be recovered by exchanging the heat with a heat transfer fluid, separating the hydrogen stream from a water stream produced, coming from a phase separator, recycling the unconsumed hydrogen by recompressing the unconsumed hydrogen only for a value of the head losses of the assembly, for the primary air circuit:

injecting ambient air into a compression pump to a pressure of between 2 and 15 bars, preheating air entering a first primary air circuit heat exchanger by means of an air stream leaving the reversible electrolyser, injecting the preheated air entering the reversible electrolyser at the target pressure, cooling the air stream leaving the reversible electrolyser in the first primary air circuit heat exchanger, cooling air leaving the first primary air circuit heat exchanger through a heat recovery element comprising a second primary air circuit heat exchanger in order to obtain heat by means of at least one heat transfer fluid, injecting air leaving the heat recovery element comprising the second primary air circuit heat exchanger into a gas turbine before ejecting outgoing air, cooling circuit:

cooling a hot stream leaving the reversible electrolyser through the first heat exchanger of the cooling circuit by a fluid entering the reversible electrolyser, cooling a stream leaving the first heat exchanger in the heat recovery element comprising the second heat exchanger of the cooling circuit by means of at least one heat transfer fluid, total cooling of the hot stream leaving the heat recovery element comprising the second heat exchanger of the cooling circuit in the third heat exchanger of the cooling circuit by the compressed fluid stream, injecting the stream leaving the third heat exchanger of the cooling circuit through which the compressed fluid stream passes into the cooling device, then a compression pump, preheating a stream leaving the compression pump by the stream leaving the reversible electrolyser before it enters the reversible electrolyser at the target pressure of 2 to 15 bars.

* * * * *